United States Patent
Imura et al.

(10) Patent No.: US 6,771,955 B2
(45) Date of Patent: Aug. 3, 2004

(54) FUNCTION LIMITING METHOD FOR TELEPHONE COMMUNICATION TERMINAL, TELEPHONE COMMUNICATION METHOD, TELEPHONE COMMUNICATION TERMINAL AND REPEATING CENTER EQUIPMENT

(75) Inventors: Shigeru Imura, Tokyo (JP); Masaru Sanpei, Kanagawa (JP)

(73) Assignee: Sony Corporation, Tokyo (JP)

( * ) Notice: Subject to any disclaimer, the term of this patent is extended or adjusted under 35 U.S.C. 154(b) by 469 days.

(21) Appl. No.: 09/753,796

(22) Filed: Jan. 3, 2001

(65) Prior Publication Data

US 2001/0016491 A1 Aug. 23, 2001

(30) Foreign Application Priority Data

Jan. 5, 2000 (JP) ..................................... P2000-005251

(51) Int. Cl.$^7$ ............................................... H04M 3/00
(52) U.S. Cl. .................. 455/420; 455/432.1; 455/456.1
(58) Field of Search ............................. 455/432.1, 435, 455/456.1, 565, 450, 422, 412.1, 435.1, 414.1; 379/67.1, 88.27, 357, 88.19, 88.22

(56) References Cited

U.S. PATENT DOCUMENTS

| 5,196,842 A | 3/1993 | Gomez et al. |
| 5,678,182 A | 10/1997 | Miller et al. |
| 5,732,349 A * | 3/1998 | Sanpei et al. ............. 455/435.1 |
| 6,222,909 B1 * | 4/2001 | Qua et al. ................. 379/88.22 |
| 6,430,270 B1 * | 8/2002 | Cannon et al. .......... 379/88.19 |
| 6,529,602 B1 * | 3/2003 | Walker et al. .............. 380/283 |

FOREIGN PATENT DOCUMENTS

| DE | 19737126 | 3/1999 |
| DE | 29910877 | 9/1999 |
| EP | 0843421 | 5/1998 |
| EP | 0915631 | 5/1999 |

* cited by examiner

Primary Examiner—Erika Gary
Assistant Examiner—Farima Farkhondar
(74) Attorney, Agent, or Firm—Jay H. Maioli

(57) ABSTRACT

An information signal processing function of a telephone communication terminal can be limited taking regulations applied to the other party or an input of the other party into consideration. A base station that repeats a radio wave of a call originating portable telephone terminal transmits a country code thereof to a telephone terminal. Based on a region identification code such as a state code (international number) or a country code included in information received upon origination of the call, the called terminal refers to a status table in a ROM thereof to specify presence or absence of limitations to recording of conversation during communication applied to a state or a region in which the call originating terminal is used. In accordance with the specified limitation contents, use of the conversation recording function during communication is controlled such that a warning sound generator transmits warning sound or a voice decoding section disables recording of the conversation.

40 Claims, 14 Drawing Sheets

FIG. 5

STATUS TABLE

| MEMORY ADDRESS (301) | INTER-NATIONAL NUMBER (302) | COUNTRY CODE (303) | STATUS (304) |
|---|---|---|---|
| 0000 Hex | NN1 | MCC1 | F Hex |
| 0005 Hex | NN2 | MCC2 | 1 Hex |
| 000A Hex | NN3 | MCC3 | F Hex |
| ⋮ | ⋮ | ⋮ | ⋮ |

FIG. 6

LIMITATION CONTENTS TABLE

| CODE (401) | LIMITATION CONTENTS (402) |
|---|---|
| 00 Hex | RFU (NOT DEFINED) |
| 01 Hex | WARNING SOUND |
| 02 Hex | REU (NOT DEFINED) |
| ⋮ | ⋮ |
| 0E Hex | RFU (NOT DEFINED) |
| 0F Hex | RECORDING REJECTED |

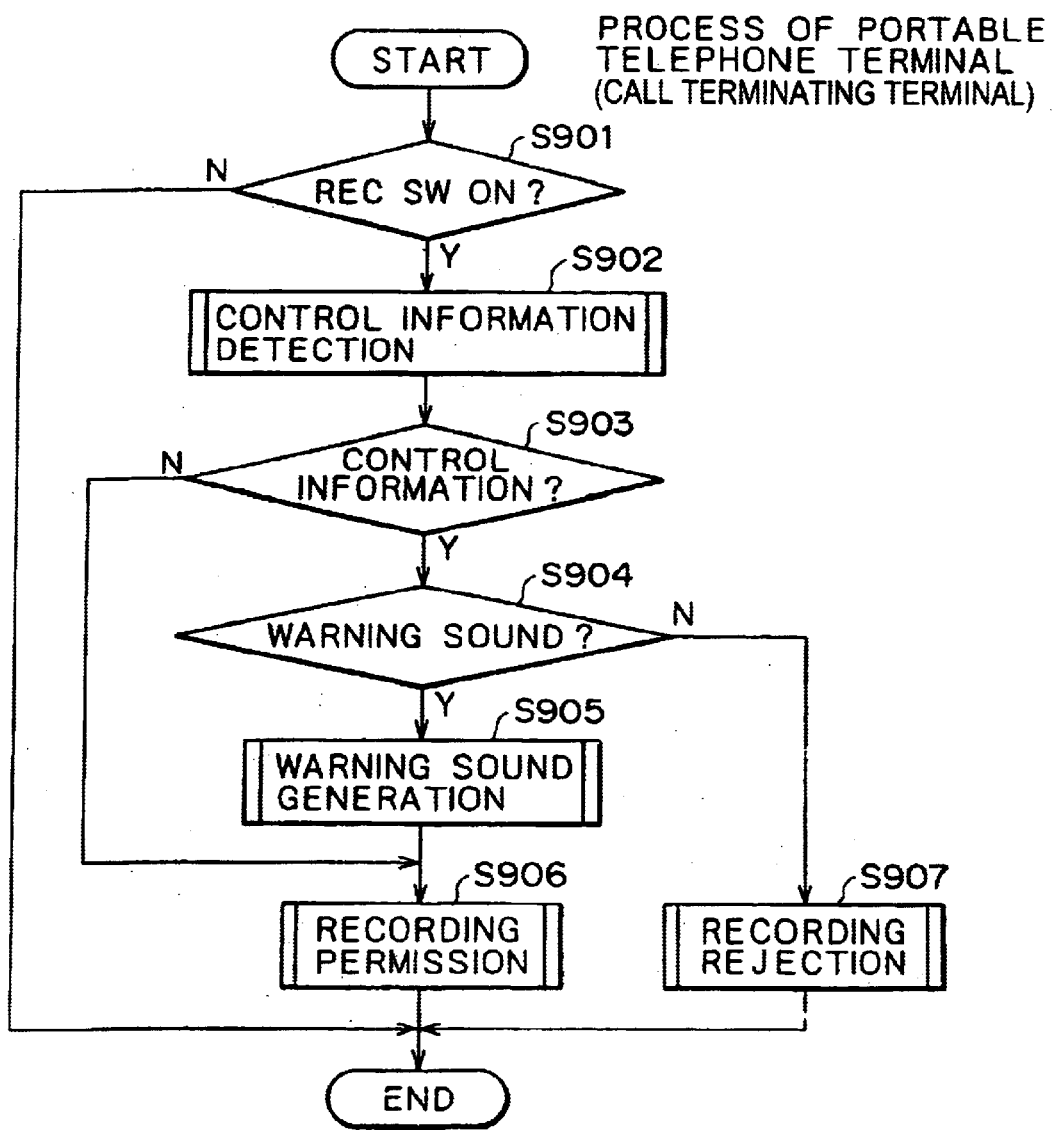

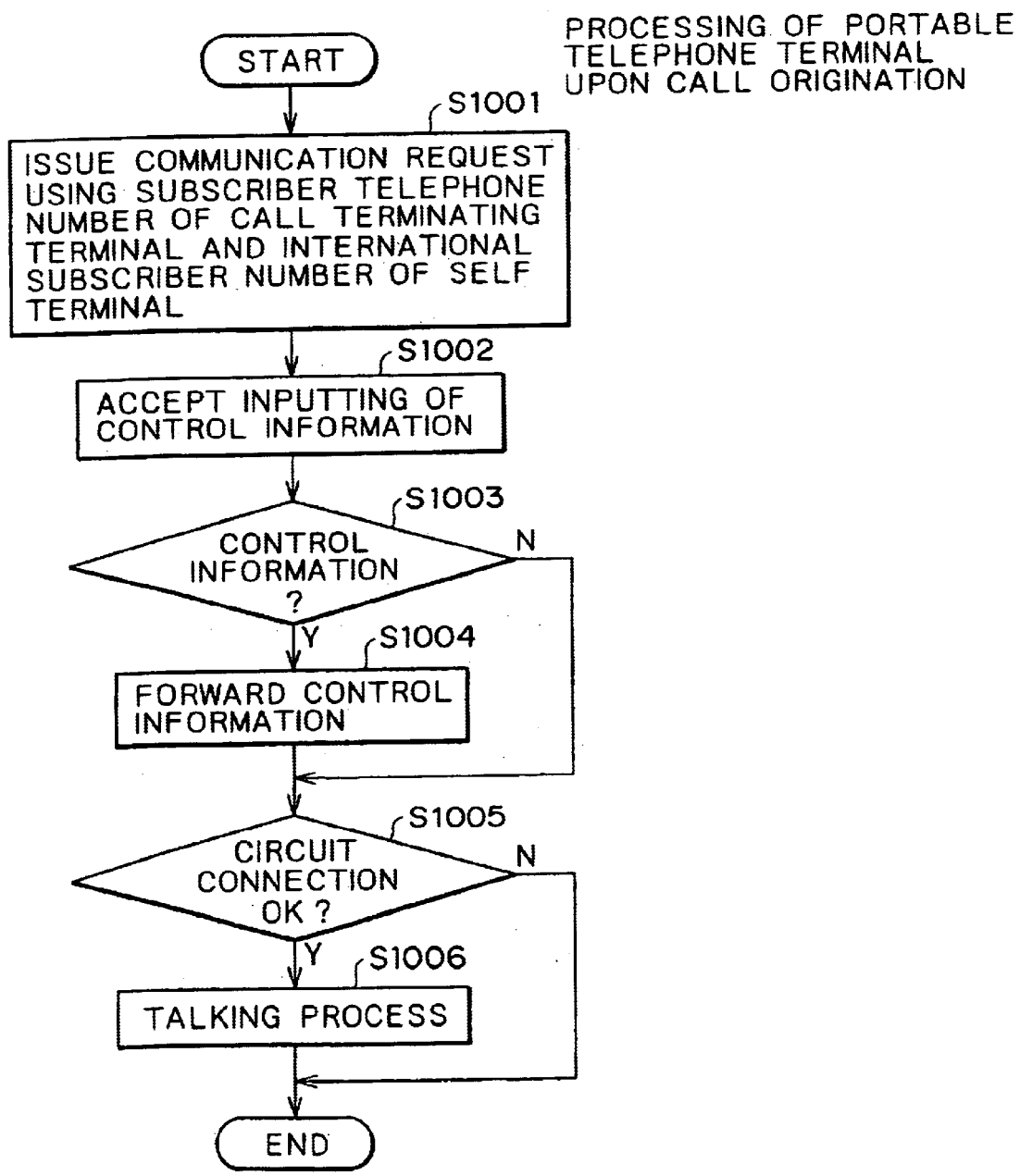

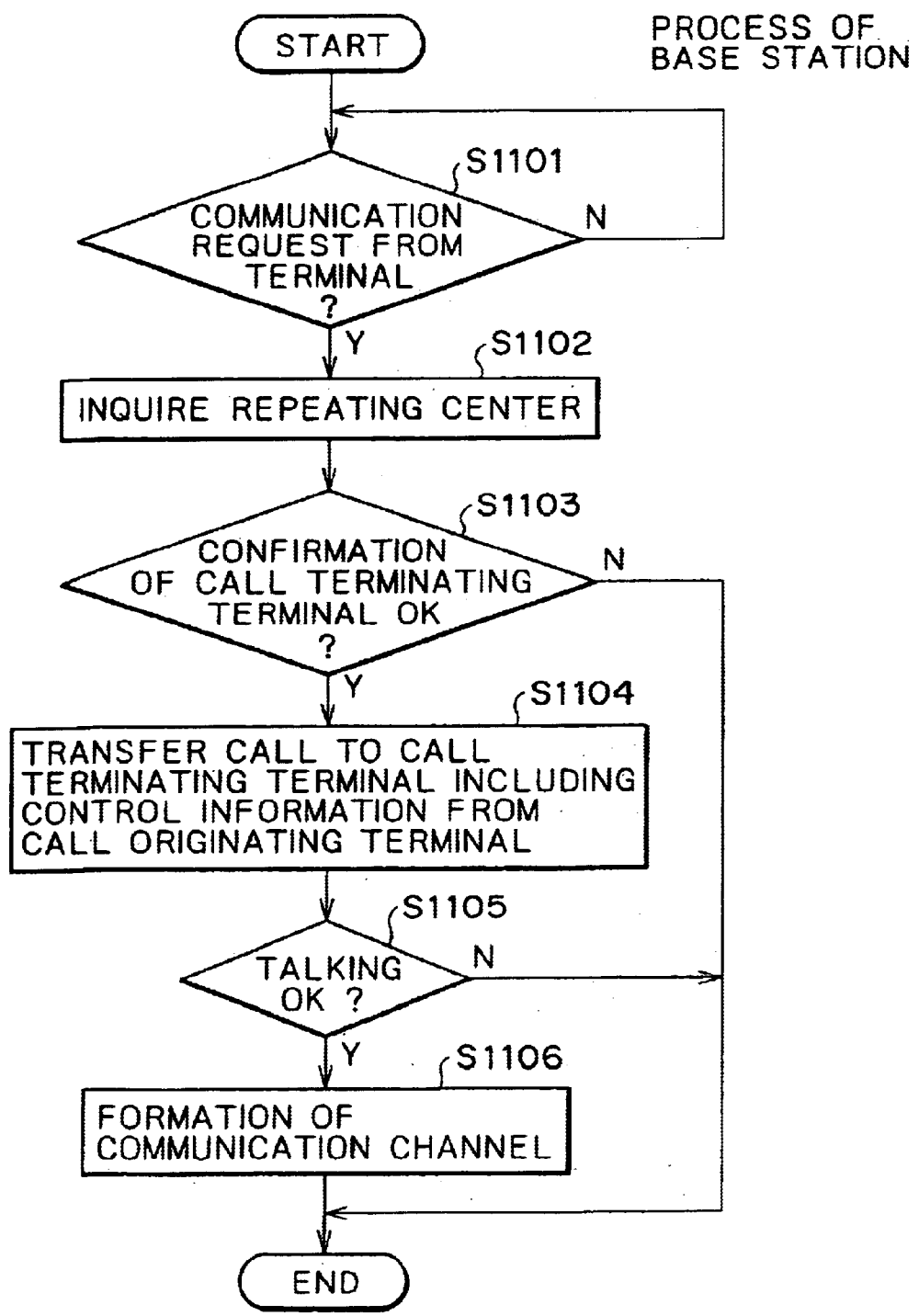

FUNCTION LIMITING METHOD FOR TELEPHONE COMMUNICATION TERMINAL, TELEPHONE COMMUNICATION METHOD, TELEPHONE COMMUNICATION TERMINAL AND REPEATING CENTER EQUIPMENT

BACKGROUND OF THE INVENTION

This invention relates to a function limiting method for a telephone communication terminal and a telephone communication method applied to telephone communication of a telephone communication terminal such as, for example, a portable telephone communication terminal with another telephone communication terminal in a state or a region in which different regulations such as laws are applied, as well as a telephone communication terminal and a repeating center equipment for use with the methods.

Variable portable telephone communication terminals are available including a portable telephone communication terminal which has a conversation recording function by which conversation during communication can be recorded simply. According to the conversation recording function, conversation with the other party during communication is recorded into a memory of the portable telephone communication terminal. Consequently, contents of the recorded conversation can be heard repetitively before they are erased.

Utilization of the conversation recording function eliminates the necessity for taking hand-written notes of contents of the conversation or of significant information presented in the conversation. Further, later playback of the recorded contents of the conversation allows the user to repetitively hear the recorded contents of the conversation by any number of times and take notes of significant matters of the conversation.

Also a communication system is available which is applied over a large number of countries such as, for example, a GSM (Global System for Mobile Communication) system. Utilization of such a communication system as just mentioned allows a telephone call to be made easily and conveniently from a mobile communication terminal such as a car phone communication terminal or a portable telephone communication terminal.

Also a communication terminal such as a mobile communication terminal is available which uses such a communication system applicable over a wide area as just described and incorporates the conversation recording function described above. In some countries, however, such legal restrictions are provided that recording of conversation during communication is inhibited or, when it is intended to record conversion during communication, the other party must be notified that the conversation is being recorded in order to protect the privacy and for the like object.

However, it is difficult for a user typically of a portable telephone communication terminal having the conversation recording function to know mandatory controls of all pertaining countries. Therefore, use of the conversion recording function may possibly cause the user to conduct an illegal act without knowing it. In order to prevent this, a portable telephone communication terminal is being investigated which detects a country code sent from a base station and indicative of a region such as a country in which the base station is positioned and discriminates, based on the country code, presence or absence typically of limitations to the conversation recording function in the region or country indicated by the country code, and observes the limitations where the limitations are applied in the region or country.

However, the portable telephone communication terminal just described takes only the country in which the portable telephone communication terminal is actually used into consideration, but does not care limitations to recording of conversation during communication in the country in which the other party of the communication is.

Accordingly, when one party A is in a country in which recording of conversation during communication is inhibited while the other party B is in another country in which there is no limitation to recording of conversation during communication, there is the possibility that, while the party A talks considering that recording of the conversation is inhibited, the other party B records the conversation arbitrarily without the consideration of the party A.

In this manner, while the conversation recording function is convenient in that contents of conversation can be recorded easily thereby, it may possibly cause a user to violate regulations such as laws of a country in which the other party of the communication is positioned without knowing it or to record the conversation against the will of the other party of the communication. Therefore, also restrictions to use of a communication terminal such as a portable telephone communication terminal prescribed in a state or a region of the other party of communication must be taken into consideration.

SUMMARY OF THE INVENTION

It is an object of the present invention to provide a function limiting method for a telephone communication terminal and a telephone communication method wherein use of a function provided for a telephone communication terminal can be limited taking regulations such as laws applied in a state or a region in which the other party of communication is positioned, a will of the other party of communication and so forth into consideration and a telephone communication terminal and a repeating center equipment for use with the methods.

In order to attain the object described above, according to an aspect of the present invention, there is provided a function limiting method for a telephone communication terminal for limiting an information signal processing function of a telephone communication terminal for processing at least a received information signal, comprising the steps of a detection step of detecting a region identification code to be used for identification of a state or a region in which a call originating terminal is used, the region identification code being included in information received upon origination of a call from the call originating terminal, and a control step of performing limitation control to the information signal processing function based on the region identification code detected in the detection step.

In the a function limiting method for a telephone communication terminal, a region identification code to be used for identification of a state or a region in which a call originating terminal is used is detected by a call terminating terminal. Then, limitation control to the information signal processing function is performed based on the detected region identification code by the call terminating terminal. In particular, it is possible for the call terminating terminal to discriminate whether or not restrictions to the information signal processing function of the call originating terminal based on regulations such as laws applied to a state or a region in which the call originating terminal is used are present and discriminate, where such restrictions are present, contents of the restrictions. Consequently, the information signal processing function of the call terminating terminal is controlled and limited based on the detected region identification code.

Therefore, the call terminating terminal can control the information signal processing function of itself so that the regulations such as laws applied to the state or the region in which the call originating terminal is used may not be violated.

According to another aspect of the present invention, there is provided a function limiting method for a telephone communication terminal for limiting an information signal processing function of a telephone communication terminal for processing at least a received information signal, comprising the steps of a detection step of detecting control information to be used to limit the information signal control information included in information received upon origination of a call, and a control step of performing limitation control to the information signal processing function based on the control information detected in the detection step.

According to a further aspect of the present invention, there is provided a telephone communication method, comprising the steps of transmitting control information to be used to control a call terminating terminal to limit an information signal processing function of the call terminating terminal from a call originating terminal side, and receiving the control information by the call terminating terminal and controlling the information signal processing function of the call terminating terminal itself based on the received control information.

According to a still further aspect of the present invention, there is provided a telephone communication method wherein at least one of telephone communication terminals used for communication is a portable telephone communication terminal, comprising the steps of producing, by a repeating center which manages position information of the portable telephone communication terminal, control information to be used to control a call terminating terminal to limit an information signal processing function of the call terminating terminal based on information included in call origination information transmitted upon call origination from a call originating terminal side, and transmitting the control information to the call terminating terminal, and receiving, by the call terminating terminal, the control information and controlling the call terminating terminal itself to limit the information signal processing function of the call terminating terminal based on the received control information.

According to the present invention, the function limiting methods for a telephone communication terminal and the telephone communication methods can be carried out by telephone communication terminals and a repeating center apparatus. In particular, according to a yet further aspect of the present invention, there is provided a telephone communication terminal, comprising information signal processing means for processing at least a received information signal, detection means for detecting a region identification code to be used for identification of a state or a region in which a call originating terminal is used, the region identification code being included in information received upon origination of a call, and control means for performing limitation control to information signal processing to be performed by the information signal processing means based on the region identification code detected by the detection means.

According to a yet further aspect of the present invention, there is provided a telephone communication terminal, comprising information signal processing means for processing at least a received information signal, detection means for detecting control information included in information received upon origination of a call and used for information signal processing to be executed by the information signal processing means, and control means for performing limitation control to information signal processing to be performed by the information signal processing means based on the control information detected by the detection means. invention, there is provided a telephone communication terminal, comprising instruction input acceptance means for accepting an instruction input regarding control information for limiting an information signal processing function of a call terminating terminal, control information production means for producing control information to be used to control the call terminating terminal to limit the information signal processing means of the call terminating terminal in response to the instruction input accepted by the instruction input acceptance means, and control information transmission means for transmitting the control information produced by the control information production means to the call terminating terminal.

According to a yet further aspect of the present invention, there is provided a telephone communication terminal, comprising instruction input acceptance means for accepting instruction input information regarding control information for limiting an information signal processing function of a call terminating terminal, and transmission means for transmitting the instruction input information accepted by the instruction input acceptance means.

According to an additional aspect of the present invention, there is provided a repeating center equipment connected to a communication network for managing position information of a portable telephone communication terminal connected to the communication network, comprising control information production means for producing control information to be used to control a call terminating terminal in the form of a portable telephone communication terminal to limit an information signal processing function of the call terminating terminal based on information included in call origination information from a call originating terminal, and control information transmission means for transmitting the control information produced by the control information production means to the call terminating terminal.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 5 is a table illustrating a status table prepared in the portable telephone terminal or a like apparatus;

FIG. 6 is a table illustrating a coordinated relationship between various statuses and limitation contents;

FIG. 13 is a flow chart illustrating a process performed in the portable telephone terminal (call terminating terminal) upon reception of a call;

FIG. 14 is a flow chart illustrating another example of a process when the portable telephone terminal originates a call; and FIG. 15 is a flow chart illustrating a further example of a process performed in the base station which receives and repeats a communication request from the portable telephone terminal.

DESCRIPTION OF THE PREFERRED EMBODIMENTS

Now, embodiments of a function limiting method for a telephone communication terminal, a telephone communication method, a telephone communication terminal and a repeating center equipment according to the present invention are described. In the embodiments described below, the function limiting method for a telephone communication terminal, telephone communication method, telephone communication terminal and repeating center equipment according to the present invention are applied to a communication system (communication network system) of the GSM system which is used in more than 100 countries.

First Embodiment

Communication System of the GSM System

Figure 1:
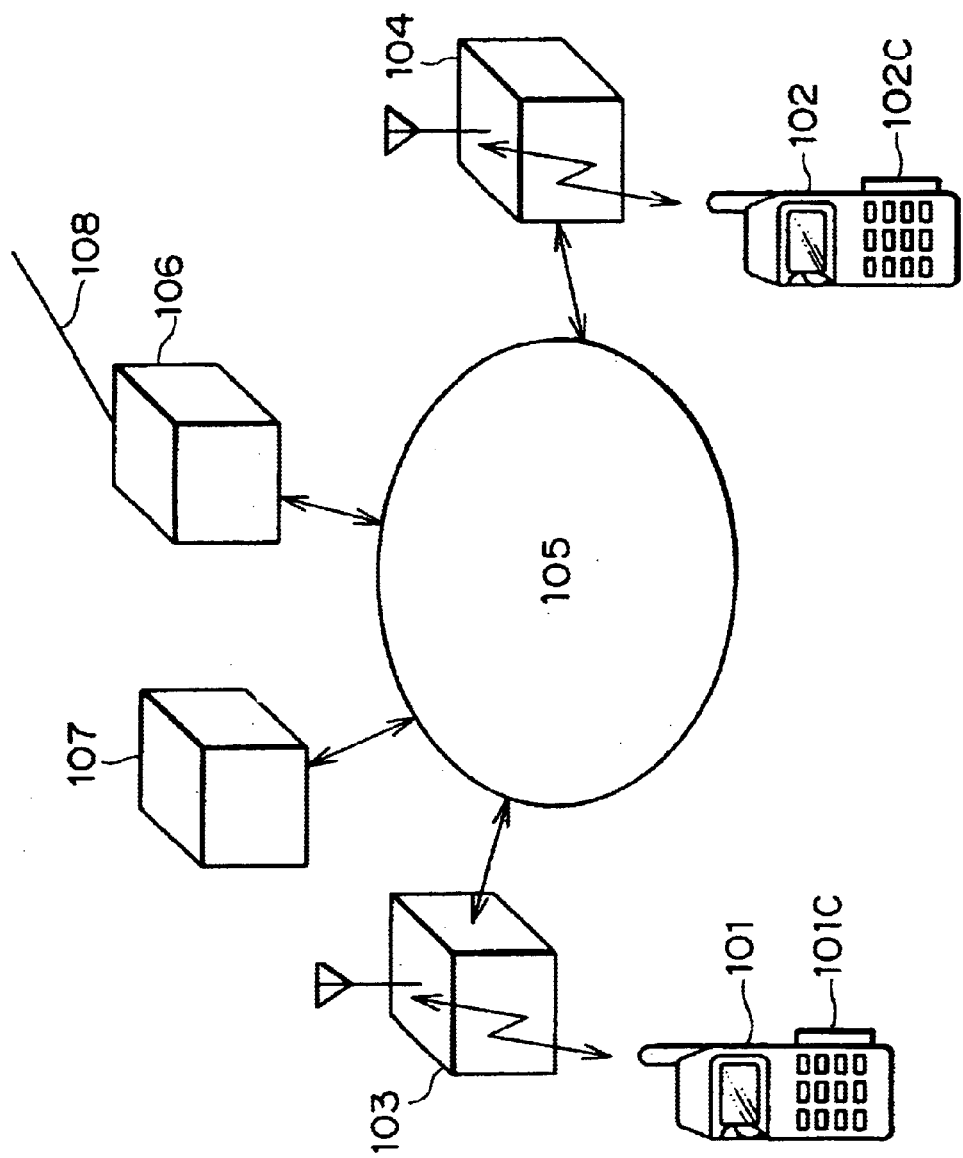
FIG. 1 is a schematic view showing a communication system to which the present invention is applied.

FIG. 1 shows the communication system of the embodiments described below. Referring to FIG. 1, a pair of portable telephone terminals (portable telephone communication terminals) 101 and 102 shown are ready for a communication system (digital cellular system) of the GSM system. The portable telephone terminals 101 and 102 perform position registration into a repeating center (authentication center) 107 provided in the communication system of the GSM system through the nearest portable telephone base stations (hereinafter referred to simply as base stations) 103 and 104, respectively.

When a position registration request is issued to the repeating center 107 from a portable telephone terminal which can be connected to the communication system of the GSM system such as the portable telephone terminal 101 or 102, the repeating center 107 allocates an international subscriber number to the portable telephone terminal of the source of the position registration request in response to the position registration request. The repeating center 107 manages the international subscriber number, a subscriber telephone number allocated to the portable telephone terminal and terminal position information in a coordinated relationship. Usually, a repeating center such as the repeating center 107 is provided for each state.

When the portable telephone terminal 101 originates a call, it connects a channel to the base station 103 by radio communication. When the telephone communication terminal of the terminating destination of the call then is, for example, the portable telephone terminal 102, the base station 103 issues an inquiry for terminal position information (current position information) of the portable telephone terminal 102 of the call terminating object to the repeating center 107 described above through an ISDN network 105.

Since any portable telephone terminal which can be connected to the communication system of the GSM system has its position and so forth registered in the repeating center 107 as described above, the terminal position of the portable telephone terminal 102 of the call terminating object is specified based on a response from the repeating center 107. Then, a communication circuit is connected between the portable telephone terminal 101 and the portable telephone terminal 102 of the call terminating object through the base station 103, the ISDN network 105 and the base station 104 which repeats a radio wave of the portable telephone terminal 102 of the call terminating object thereby to allow communication.

On the other hand, when a call originated from the portable telephone terminal 101 is destined for a wired telephone terminal (wired telephone communication terminal) connected to the communication system of the present embodiment through a public switched telephone network (PSTN) station 106 and a telephone network 108, a communication circuit is connected between the portable telephone terminal 101 and the object wired telephone terminal through the base station 103, ISDN network 105 and PSTN station 106 thereby to allow communication between the portable telephone terminal 101 and the object wired telephone terminal.

It is to be noted that discrimination of whether the telephone communication terminal of the call terminating object is a portable telephone terminal which can be connected to the communication network of the GSM system or a telephone communication terminal such as a wired telephone terminal other than the portable telephone terminal can be performed by a base station or a PSTN station based on a symbol or a numeral at a predetermined column position of input information such as a subscriber telephone number of the telephone communication terminal of the call terminating object inputted to the telephone communication terminal of the call originating source. The discrimination is sometimes based on a plurality of pieces of input information.

In the present embodiment, position registration from the portable telephone terminal 101 or 102 into the repeating center 107 is performed using a subscriber number recorded in a memory card (SIM card: Subscriber Identity Module card) 101C or 102C which is loaded in the portable telephone terminal 101 or 102 and on which personal information of the subscriber of the portable telephone terminal 101 or 102 is recorded. After an international subscriber number is allocated, each of the portable telephone terminals 101 and 102 is managed based on the international subscriber number on the communication system.

In the present embodiment, the subscriber number recorded on the SIM card is different from the subscriber telephone number. In other words, the subscriber number is an identification number unique to each subscriber. While a subscriber telephone number is allocated to each portable telephone number separately from a subscriber number, it is managed in a coordinated relationship with an international subscriber number, terminal position information and other necessary information by a repeating center as described hereinabove.

Where an international subscriber number different from a subscriber telephone number is used in this manner, even if a SIM card on which the subscriber number is recorded or a portable telephone terminal in which the SIM card is loaded is lost or stolen, the subscriber telephone number need not be changed if the subscriber number is changed. Further, since no unnecessary subscriber telephone number is generated in the repeating center 107, individual subscribers can be managed efficiently.

In a communication system of the GSM system, an international subscriber number is newly allocated as information typically called TMSI (Temporary Mobile Subscriber Identity) each time position registration is performed. The TMSI is information allocated temporarily as a result of movement of the portable telephone terminal while the international subscriber number is recorded on the SIM for identification of the subscriber. Accordingly, the possibility that the international subscriber number may leak to an unrelated person is low, which thus allows realization of a communication system which is high in concealing performance and high in reliability.

In the communication system of the present embodiment, in what country a portable telephone terminal (self terminal) is being used can be discriminated from a country code included in a channel called BCCH (Broadcast Control Channel) sent from a base station which repeats a radio wave from the self terminal. For example, the country code of the base station can be discriminated from the BCCH received from the base station 103 when the portable telephone terminal 101 registers its position into the base station 103. Also the country in which the portable telephone terminal 102 is being used can be discriminated from the BCCH received from the base station 104.

In particular, each base station has a network code (identification code of a telephone company or the like), a country code and so forth and can provide such information to a portable telephone terminal using the BCCH. Further, each base station can transmit such information also to a telephone communication terminal of the call terminating object or a repeating center with the information included in call origination information from the call originating terminal.

Further, in which country a telephone communication terminal of the call originating source is being used can be discriminated by a telephone communication terminal of the call terminating object, where the telephone communication terminal of the call originating source is a telephone communication terminal used in a fixed country such as a wired telephone terminal, from a state code (international number) supplied together with a subscriber telephone number allocated to the telephone communication terminal of the call originating source. In particular, an international number unique to each state such as, for example, 81 to Japan or 49 to Germany is provided together with a subscriber telephone number to the telephone communication terminal of the call terminating object.

On the other hand, where the telephone communication terminal of the call originating source is a portable telephone communication terminal which can be connected to a communication system of the GSM system, the telephone communication terminal of the call terminating object can discriminate in which country the telephone communication terminal of the call originating source is being used from a country code originating from a base station which repeats a radio wave from the portable telephone terminal of the call originating source and indicative of a region in which the base station is positioned.

Thus, in the first embodiment, the telephone communication terminal of the call terminating object can limit, based on the country code provided by the BCCH from a base station which repeats a radio wave from the self terminal, use of the conversation recording function during communication which is an information signal processing function provided for the self terminal taking regulations such as laws applied to the country in which the self terminal is used into consideration.

Further, in the first embodiment, the telephone communication terminal of the call terminating object can limit, based on an international number or a country code provided from the telephone communication terminal of the call originating source and representative of a country or a region in which the telephone communication terminal of the call originating source is used, use of the conversation recording function during communication, which is an information signal processing function of the telephone communication terminal of the call terminating object, taking also regulations such as laws applied to a state or a region in which the telephone communication terminal of the call originating source is used into consideration.

In this manner, in the first embodiment, an international number or a country code is used as a region identification code to prevent a violation of limitations to the conversation recording function during communication which are applied in a country or a region in which a telephone communication terminal of the call terminating object is used and further prevent a violation of limitations to the conversation recording function during communication which are applied in a country or a region in which a telephone communication terminal of the call originating source is used thereby to prevent invasion of privacy or a trouble between communicating parties.

Portable Telephone Terminal

Figure 2:
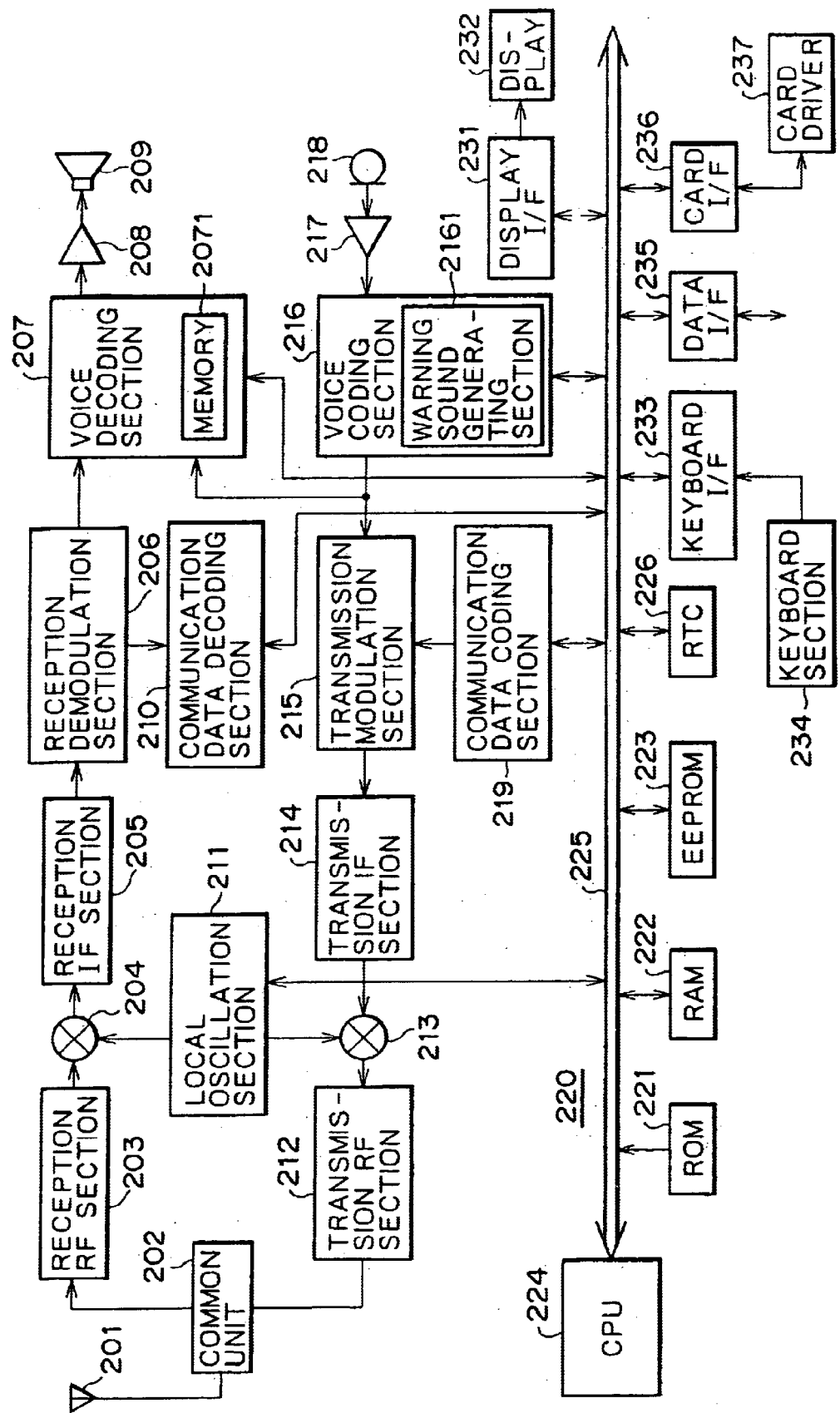
FIG. 2 is a block diagram showing a portable telephone terminal to which a telephone communication terminal according to the present invention is applied.

Now, a portable telephone terminal used in the communication system of the present embodiment is described. FIG. 2 shows a portable telephone terminal which can be connected to the communication system of the present embodiment such as the portable telephone terminal 101 or 102 shown in FIG. 1. The portable telephone terminal of the present embodiment has a configuration substantially similar to that of an ordinary digital cellular portable telephone terminal.

A reception signal received through an antenna 201 is supplied to a reception RF section 203 through an antenna common unit 202. The reception RF section 203 performs such necessary processing as bandwidth limitation and AGC (Automatic Gain Control) so that the received reception signal may have an appropriate level, and supplies a resulting signal to a mixer 204.

The mixer 204 mixes a signal from a local oscillation section 211 having a controlled frequency and an output signal of the reception RF section 203 with each other in order to convert the reception frequency of the reception signal into a fixed frequency. An output signal of the mixer 204 is supplied to a reception IF section 205. The reception IF section 205 performs A/D (Analog to Digital) conversion of the signal supplied thereto to form IQ digital data having a fixed bit rate. The IQ digital data is supplied to a reception demodulation section 206.

The reception demodulation section 206 performs elimination of influences such as fading, discrimination of the type of the received signal, deinterleaving and error correction for the IQ digital data supplied thereto and then performs suitable decoding to demultiplex voice data and the other communication data from each other. The demultiplexed voice data is supplied to a voice decoding section 207 while the other communication data is supplied to a communication data decoding section 210.

Since voice data is normally transmitted in a block of compressed data for each burst, the voice decoding section 207 decompresses and decodes the voice data supplied thereto and then performs D/A (Digital to Analog) conversion of the decompressed decoded voice data in accordance with a sampling rate for voice. Then, the analog voice signal obtained by the D/A conversion is power amplified by a speaker amplifier 208 and then supplied to a speaker 209, from which voice is emitted in accordance with the analog signal.

On the other hand, the communication data supplied to the communication data decoding section 210 is decoded back into final original data by the communication data decoding section 210. The decoded communication data is transmitted typically over a CPU bus 225 through a data interface (represented as data I/F in FIG. 2) 235 to an external apparatus or the like.

Subsequently, a transmission system is described. A microphone 218 collects voice and converts the collected voice into an analog voice signal. The microphone 218 supplies the analog voice signal to a microphone amplifier 217. Since the output power of the microphone 218 is low, the microphone amplifier 217 amplifies the analog voice signal supplied thereto to a necessary voltage. The amplified analog voice signal is supplied to a voice coding section 216.

The voice coding section 216 first performs A/D conversion of the analog voice signal supplied thereto at a suitable sampling rate and then converts the resulting analog signal into a digital signal. Then, the voice coding section 216 codes and compresses the digital voice signal in accordance with a predetermined coding method and arranges the coded compressed voice signal into blocks suitable for a burst signal of a transmission RF signal.

Meanwhile, digital data inputted from an external apparatus through the data I/F 235 is arranged into suitable blocks by a communication data coding section 219. Data from the voice coding section 216 and the communication data coding section 219 are converted into IQ digital data having a fixed data rate by a transmission modulation section 215.

The IQ digital data are converted into an analog modulation signal by D/A conversion by a transmission IF section 214 and then mixed with a signal for conversion from the local oscillation section 211 by a mixer 213 so that the analog modulation signal may be converted into a signal of a predetermined transmission frequency. The resulting signal of the desired frequency is power amplified by a transmission RF section 212 so as to have a necessary transmission power and is then radiated (transmitted) from the antenna 201 through the antenna common unit 202.

A ROM (Read Only Memory) 221 has stored therein in advance programs to be executed by a CPU (Central Processing Unit) 224 and necessary data such as a font for display. A RAM (Random Access Memory) 222 is used principally as a working area and is used to store data in the course of calculation during execution of a program by the CPU 224 when necessary. The RAM 222 is further used to temporarily store data communicated between a control section 220 and other components of the portable telephone terminal of the present embodiment. The control section 220 is formed from the CPU 224, the ROM 221, the RAM 222, an EEPROM (Electrically erasable and programmable ROM) 223, and a RTC (Real Time Clock) 226 connected to each other by the CPU bus 225.

The EEPROM 223 is used to store setting conditions as setting parameters typically immediately before power supply to the portable telephone terminal is disconnected so that, when power supply to the portable telephone terminal is connected subsequently, the portable telephone terminal may be set to the same setting conditions. The RTC 226 counts time and thus provides time data, that is, data of the year, month, day and hour. The RTC 226 is used, for example, for a time stamp of data or the like, a time display of the portable telephone terminal, and an alarm.

The portable telephone terminal of the present embodiment further includes a display interface (represented as display I/F in FIG. 2) 231, a keyboard interface (represented as keyboard I/F in FIG. 2) 233 and a card interface (represented as card I/F in FIG. 2) 236. Display data from the control section 220 is supplied to a display unit 232 through the display I/F 231.

A keyboard section 234 includes ten keys and various function keys, and input data from a user inputted through the keyboard section 234 is supplied to the control section 220 through the keyboard I/F 233. Further, data is communicated between a SIM card loaded in a SIM card drive section 237 and the control section 220 of the portable telephone terminal through the card I/F 236 and the SIM card drive section 237.

It is to be noted that, in the portable telephone terminal of the present embodiment, a voice signal from the microphone 218 is sent back from the voice coding section 216 to the voice decoding section 207. Consequently, the voice signal from the microphone 218 is mixed with a voice signal of the receiving party, converted into an analog voice signal by a D/A converter of the voice decoding section 207 and emitted as voice from the speaker 209. In other words, part of the voice of the talking party can be heard from the speaker 209.

This is called talker side tone and is used to prevent or moderate such a situation that, because a receiver portion of the portable telephone terminal covers an ear of the talker to decrease the magnitude of the uttered voice of the talker which is heard by the talker itself, the talker talks with voice of an increasing magnitude intending to compensate for the decreased magnitude of the uttered voice unconsciously.

The portable telephone terminal of the present embodiment has a conversation recording function in that data for recording extracted from a digital voice signal, which includes mixed voice of the other party of communication and the talker, by the voice decoding section 207 is recorded into a voice recording memory 2071.

Further, in the portable telephone terminal of the present embodiment, a warning sound generation section 2161 is provided in the voice coding section 216. The warning sound generation section 2161 generates warning sound, as will be described hereinafter, to be transmitted to the other party of communication in such a case that, for example, a portable telephone terminal of the other party of communication is used in a country in which it is prescribed for protection of privacy that, when a talker records its conversation upon communication, the talker must notify the other party of conversation that recording of the conversation of communication is being performed.

Furthermore, in the portable telephone terminal of the first embodiment, when it receives a call and thus serves as a call terminating terminal, the control section 220 controls the voice decoding section 207 and/or the warning sound generation section 2161 to limit the conversation recording function upon communication based on both limitations to the conversation recording function which are applied in a country or a region in which the portable telephone terminal is used and limitations to the conversation recording functions applied in a country or a region in which the telephone terminal of the call originating source is used.

Position Registration of a Portable Telephone Terminal into a Repeating Center

First, a position registration process of the portable telephone terminal having the configuration shown in FIG. 2 into a repeating center is described. Here, a process when the portable telephone terminal 101 having the configuration described above with reference to FIG. 2 in the communication system of the GSM system described hereinabove with reference to FIG. 1 performs position registration into the repeating center 107 is described with reference to flow charts of FIGS. 3 and 4.

Figure 3:
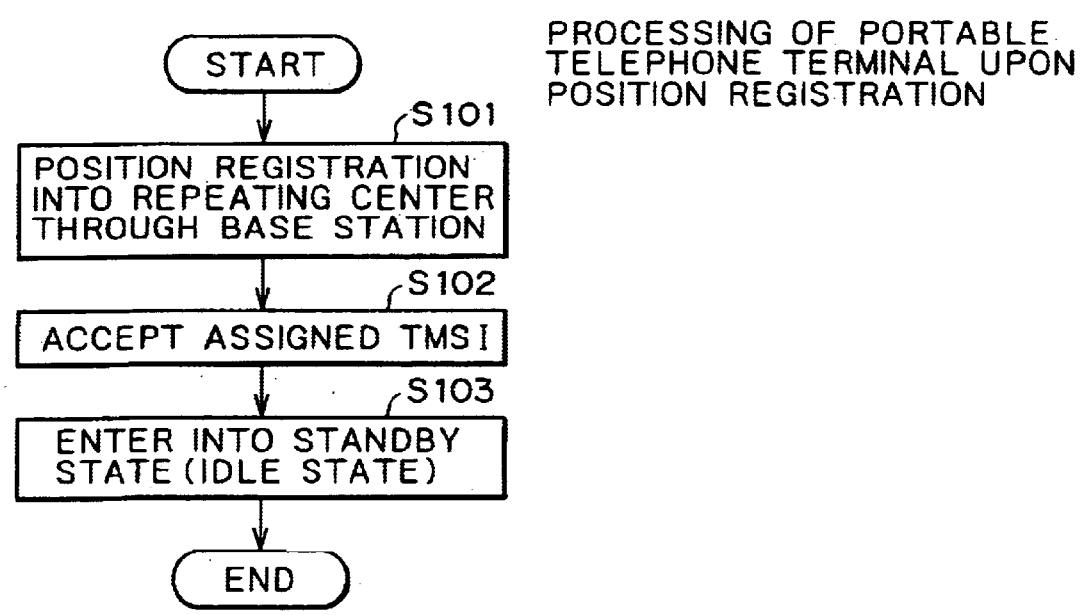
FIG. 3 is a flow chart illustrating a process performed in the portable telephone terminal upon position registration.

The process illustrated in the flow chart of FIG. 3 is executed when the portable telephone terminal 101 in a non-used state wherein no power supply is connected to the portable telephone terminal 101 is put into a used state as a result of connection of power supply. As described hereinabove, an international subscriber number of the user of the portable telephone terminal 101 is recorded on the SIM card 101C loaded in the portable telephone terminal 101.

After power supply is connected to the portable telephone terminal 101, the CPU 224 of the control section 220 executes a program stored in the ROM 221 and used for position registration. In accordance with the program thus executed, the CPU 224 reads out the international subscriber number recorded on the SIM card 101C loaded in the SIM card drive section 237 of the portable telephone terminal 101, and forms and transmits a position registration request including the international subscriber number (step S101).

In this instance, the position registration request is transmitted from the portable telephone terminal 101 through the communication data coding section 219, transmission modulation section 215, transmission IF section 214, mixer 213, transmission RF section 212, common unit 202 and antenna 201.

The position registration request is transmitted to the repeating center 107 through the nearest base station to the portable telephone terminal 101 and the ISDN network 105. Then, the repeating center 107 performs an authentication process as to whether or not the position registration request originates from a subscriber of the communication system of the GSM system. In case of success of the authentication, the repeating center 107 allocates a TMSI to the portable telephone terminal 101 of the source of the request. The TMSI is signaled from the repeating center 107 and supplied to the portable telephone terminal 101 through the ISDN network 105 and the base station 103.

The portable telephone terminal 101 receives the TMSI from the repeating center 107 and stores the TMSI into a memory such as the RAM 222 of the self terminal (step S102). In the communication system of the GSM system, each portable telephone terminal is managed with its TMSI allocated by the repeating center 107.

Then, the portable telephone terminal 101 to which the TMSI is allocated enters a standby state (idle state) (step S103), in which it can originate a call or can detect a call and notify the user of the call.

Figure 4:
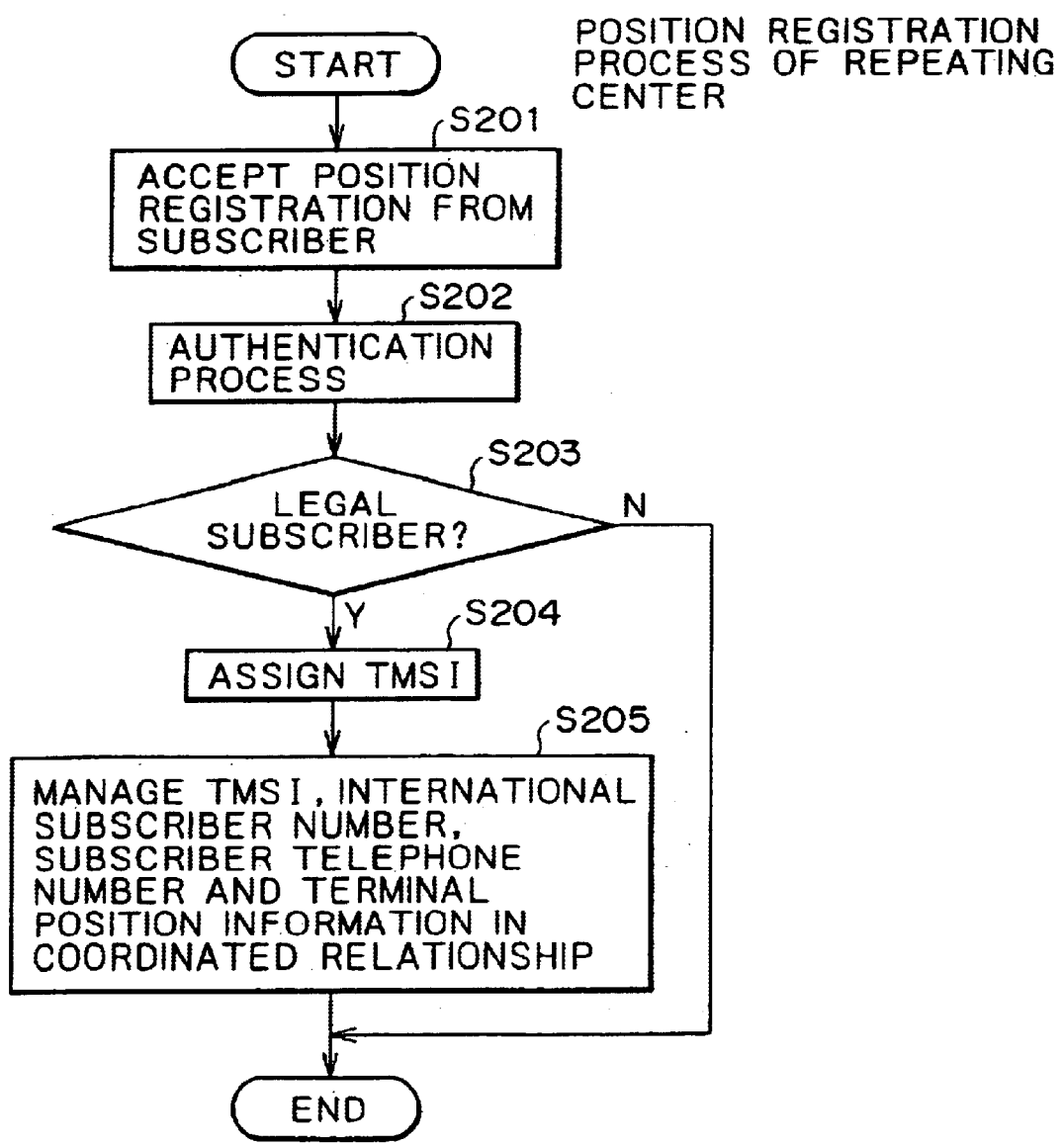
FIG. 4 is a flow chart illustrating a process performed in a repeating center upon acceptance of position registration.

Now, a process of the repeating center 107 which receives a position registration request from a portable telephone terminal is described. FIG. 4 is a flow chart illustrating the process of the repeating center 107 which receives the position registration request from the portable telephone terminal 101.

When the repeating center 107 receives the position registration request from the portable telephone terminal 101, it accepts the position registration request (step S201) and performs an authentication process based on a subscriber number included in the accepted position registration request (step S202). The authentication process in step S202 is performed in order to confirm whether or not the portable telephone terminal which has transmitted the position registration request subscribes for the communication system of the GSM system and therefore can be connected to the communication system of the GSM system.

Then, the repeating center 107 discriminates whether or not the user of the portable telephone terminal which has transmitted the position registration request is a legal subscriber (step S203). If it is discriminated in the discrimination process in step S203 that the user is a legal subscriber, then the repeating center 107 allocates a TMSI to the portable telephone terminal which has transmitted the position registration request and transmits the TMSI to the portable telephone terminal of the source of the request (step S204).

Then, the repeating center 107 manages the allocated TMSI, the international subscriber number, the subscriber telephone number and terminal position information representative of the current position of the portable telephone terminal in a coordinated relationship (step S205). Here, the terminal position information allows specification of a base station which first repeats a radio wave from the portable telephone terminal which has transmitted the position registration request as described above, and to this end, includes a country code or the like which indicates a region in which the base station is positioned.

In this manner, each portable telephone terminal which subscribes for the communication system of the GSM system is managed in a coordinated relationship with its international subscriber number, subscriber telephone number and terminal position information by the repeating center. When it is tried to make a telephone call to a portable telephone terminal which subscribes for the communication system of the GSM system, if an inquiry is issued to the repeating center, then it can be known where the portable telephone terminal which is a call terminating object terminal is positioned at present.

More particularly, since it can be specified with what base station in what country the portable telephone terminal as a call terminating object terminal is positioned for communication, any portable telephone terminal which subscribes for the communication system of the GSM system can receive a terminating call and can telephone to the object party wherever the portable telephone terminal is in the world.

Limitations to the Conversation Recording Function of a Call Terminating Terminal Now, limitation control to the conversation recording function during communication as an information signal processing function of the self terminal performed by a portable telephone terminal of the call terminating object is described. The portable telephone terminal of the present embodiment allows limitation to use of the conversation recording function taking restrictions to recording of conversation during conversation applied to a state or a region in which the self terminal is used and restrictions to recording of conversation during communication applied to a state or a region in which the telephone terminal of the call originating source is used into consideration as described above.

Here, an example is described first wherein the telephone communication terminal of the call originating source (hereinafter referred to as call originating terminal) is a telephone communication terminal used fixedly in a fixed country such as, for example, a wired telephone terminal which is connected to the ISDN network 105 through the PSTN station 106 and the telephone communication terminal of the call terminating object (hereinafter referred to as call terminating terminal) is the portable telephone terminal of the present embodiment described hereinabove with reference to FIG. 2.

A subscriber telephone number allocated to the call originating terminal is transmitted together with an international number (state code) of a state in which the call originating terminal is used to the portable telephone terminal serving as the call terminating terminal. Thus, the call terminating terminal specifies the country in which the call originating terminal is used based on the state code supplied together with the subscriber telephone number of the call originating terminal, investigates whether or not regulations such as laws applied to the state limit recording of conversation during communication, and specifies contents of the limitation if recording of conversation during communication is limited.

To this end, the portable telephone terminal of the present embodiment includes a status table illustrated in FIG. 5 and a limitation contents table illustrated in FIG. 6. In FIGS. 5 and 6, the alphabetical term Hex represents that the pertaining value is represented in a hexadecimal representation. The status table of FIG. 5 shows an example wherein a list of countries in which some limitations are applied to the conversation recording function during communication is given as data. The status table is prepared, for example, in the ROM 221 of the portable telephone terminal.

An address 301 of the status table is an address, for example, of the ROM 221 in which the status table is stored and indicates a start address of one data set. Here, the data is composed of 5 bytes. An international number 302 represents a state number allocated to each state. For example, the number 81 is allocated to Japan, 49 to Germany, and 1 to the United States.

A country code 303 is basically same as the international number 302. However, where a state has a great territory, it is sometimes divided into several regions which are identified with different country codes, and the country code 303 is provided for this reason. The international number 302 and the country code 303 are each composed of 2 bytes and indicate data of 4 digits in the BCD (Binary Coded Decimal) code.

Here, in the status table illustrated in FIG. 5, the international number 302 is used as information for discriminating restrictions with regard to a location where the other party (call originating terminal) is, and the country code 303 is used as information for discrimination of restrictions with regard to a location where the self terminal (call originating terminal) is.

A status 304 is a portion in which coded data of contents of limitations is placed. The contents are described in connection with an example of coding of the limitation contents table of FIG. 6.

The limitation contents table of FIG. 6 illustrates an example wherein limitation contents to the conversation recording function of a telephone terminal in a state or a region in which limitations to the conversation recording function of a telephone number are applied are represented as data. The limitation contents table is composed of one byte. In FIG. 6, a code 401 is provided for identification of limitation contents allocated to the limitation contents. It is to be noted that the code denoted by RFU in FIG. 6 is reserved for future setting.

In the present embodiment, as seen in FIG. 6, the code 01 (Hex) is interpreted as warning sound as seen from limitation contents 402. Meanwhile, the code 0F (Hex) is interpreted as rejection of recording. In the status table of FIG. 5 described above, F (Hex) in the status 304 is interpreted as rejection of recording, and 1 (Hex) is interpreted as warning sound.

It is to be noted that it is interpreted that a state or a region which has an international number or a country code which is not included in the status table illustrated in FIG. 5 is free from any limitation to the conversation recording function of a telephone terminal and thus permits recording of conversation. Accordingly, also a code representative of permission of recording is not found in the limitation contents table illustrated in FIG. 6 either. This signifies that it is not necessary to prepare a status table for all international numbers and country codes, which results in suppression of the data amount of the status table or the limitation contents table and reduction of the required storage capacity for a memory.

Subsequently, operation when a call is terminated at a portable telephone terminal which includes the status table and the limitation contents table described hereinabove with reference to FIGS. 5 and 6 is described with reference to a flow chart of FIG. 7.

Figure 7:
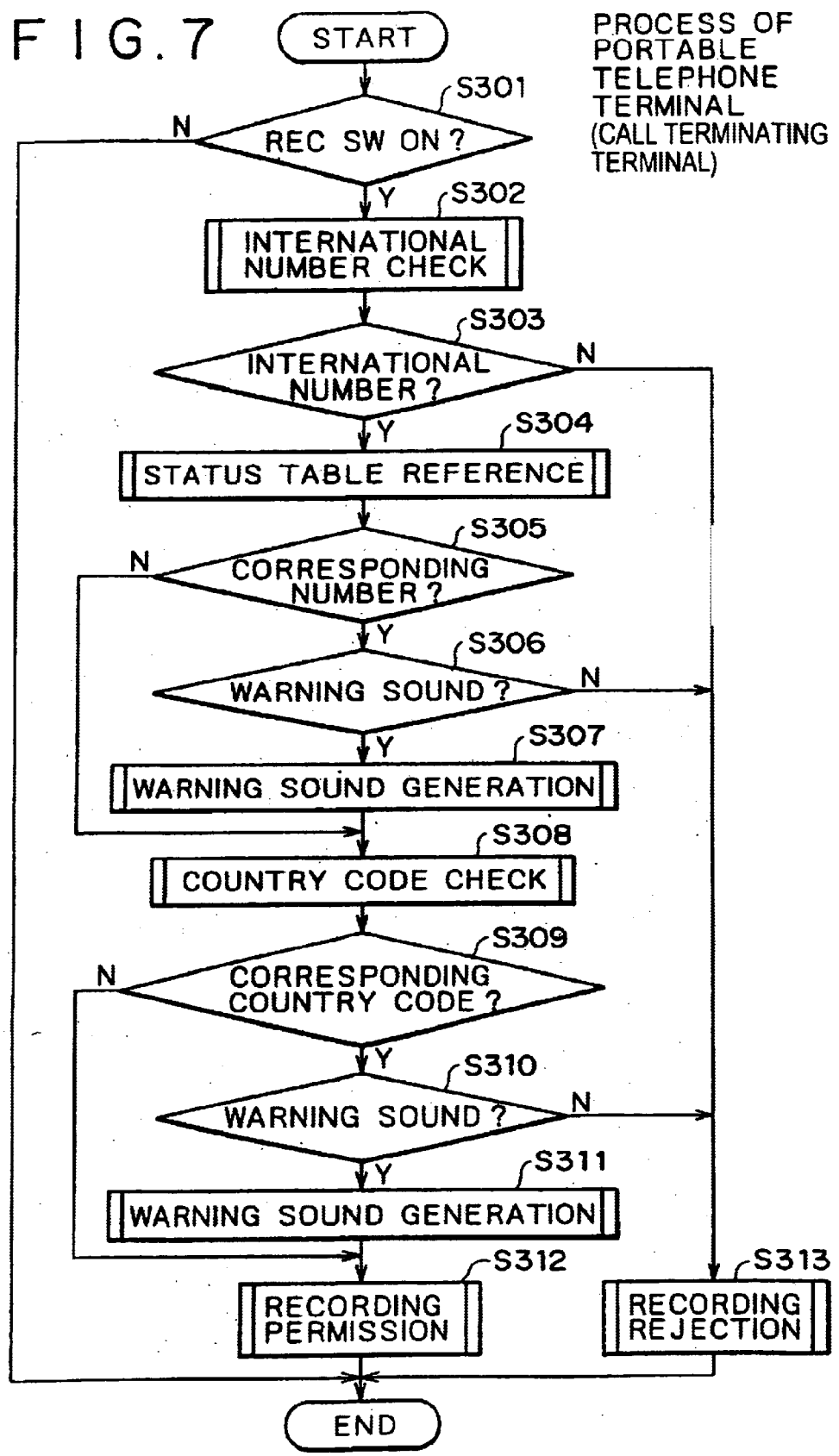
FIG. 7 is a flow chart illustrating a process performed in the portable telephone terminal (call terminating terminal) upon reception of a terminating call.

The process illustrated in FIG. 7 is executed by the control section 220 when the portable telephone terminal detects a call and the user of the portable telephone terminal operates the portable telephone terminal so as to respond to the call. First, the control section 220 of the portable telephone terminal discriminates whether or not a REC switch (recording switch) provided on the keyboard section 234 is on in order to perform recording of conversation, that is, whether or not the conversation recording function is in an enabled state (step S301)

If it is discriminated in the discrimination processing in step S301 that the REC switch is not on, then the process illustrated in FIG. 7 is ended. If it is discriminated in the discrimination processing in step S301 that the REC switch is on, then an international number check for checking whether or not an international number transmitted together with a subscriber telephone number allocated to the call originating terminal as described above has been sent correctly is performed (step S302).

Then, it is discriminated whether or not an international number has been sent together with the subscriber telephone number of the call originating terminal (step S303). If it is discriminated in the discrimination processing in step S303 that an international number has not been sent, then the state in which the call originating terminal is used cannot be discriminated. In other words, it cannot be discriminated whether or not recording is possible. Therefore, as a countermeasure for safety, in the present embodiment, recording is rejected (in step S313), thereby ending the process illustrated in FIG. 7.

It is to be noted that the processing in step S313 is to stop the conversation recording function which is rendered operative when the REC switch is switched on, and this is performed particularly by the control section 220 which controls the voice decoding section 207 so that the conversation may not be recorded into the voice recording memory 2071 of the voice decoding section 207.

If it is discriminated by the discrimination processing in step 8303 that an international number has been sent, then the status table illustrated in FIG. 5 which is stored in the ROM 221 of the self terminal is referred to, in order to investigate what limitations are applicable (step S304).

Then, it is discriminated whether or not pertaining data is included in the status table (step S305). If the pertaining data is not found, then it is determined that limitations to recording of conversation during communication are not applied in the state or the region in which the call originating terminal is used, and the processing advances to a country check in step S308 which is processing for checking the country code of a place where the user of the call terminating terminal is.

If it is discriminated in the discrimination processing in step S305 that pertaining data is present, then it is discriminated whether or not the pertaining data is transmission of warning sound, which is a discrimination for checking what limitations are applied (step S306). If the pertaining data is not transmission of warning sound in the discrimination processing in step S306, then it can be determined that recording is not permitted, and consequently, the processing advances to step S313, in which recording is disabled, thereby ending the process illustrated in FIG. 7.

On the other hand, if it is discriminated in the discrimination processing in step S306 that transmission of warning sound is designated, then the control section 220 controls the warning sound generation section 2161 of the voice coding section 216 to generate warning sound and transmit the generated warning sound to the call originating terminal (step S307).

If it is discriminated in the discrimination processing in step S305 that the pertaining data is not found in the status table or if the processing for generation of warning sound in step S307 is performed as described above, then the call terminating terminal performs a country code check in order to perform a discrimination with regard to the country or region in which the self terminal is used (step S308).

The processing of checking the country code in step S308 is checking of the status table based on the country code included in the channel called BCCH sent from the base station into which the call originating terminal has performed its position registration.

In particular, in the flow chart shown in FIG. 7, the processing from step S302 to step S307 is processing for taking regulations such as laws applied to the state or the region in which the call originating terminal is used into consideration whereas the processing from step S308 to step S311 is processing for taking regulations such as laws applied to the state or the region in which the call terminating terminal is used into consideration.

Then, based on the country code of the region in which the call terminating terminal is used, the call terminating terminal refers to the status table to discriminate whether or not pertaining data is present, that is, whether or not limitation to the conversation recording function during communication are applied in the state or the region in which the call terminating terminal is used (step S309).

If no pertaining data is found in the discrimination processing in step S309, then since recording is possible, the control section 220 advances its processing to step S312 in order to enable the conversation recording function to function during communication. In particular, in step S312, the control section 220 controls the pertaining components of the portable telephone terminal to establish a mode in which conversation can be recorded and start the conversation recording function (step S312), thereby ending the process illustrated in FIG. 7.

On the other hand, if it is discriminated in the discrimination processing in step S309 that pertaining data is present, then the control section 220 discriminates whether or not the contents of the status of the pertaining data indicate transmission of warning sound (step S310). If it is discriminated in the discrimination processing in step S310 that the contents of the status of the pertaining data do not indicate transmission of warning sound, then it can be determined that recording of conversation is not permitted.

In this instance, in order to disable the conversation recording function even if the other party (call originating terminal) side can record conversation or can transmit warning sound, the control section 220 advances the processing to step S313. In step S313, the control section 220 disables recording of conversation (stops operation of the pertaining components), thereby to end the process illustrated in FIG. 7.

If it is discriminated in the discrimination processing in step S310 that transmission of warning sound is indicated, then the control section 220 controls the warning sound generation section 2161 of the voice coding section 216 to generate warning sound for warning against recording of conversation during communication and transmit the warning sound to the call originating terminal (step S311) similarly as in the processing in step S307 described hereinabove. Then in step S312, in order to cause the conversation recording function during communication to operate, the control section 220 controls the pertaining components of the portable telephone terminal to establish a mode in which recording of conversation can be performed and start the conversion recording function (step S312), thereby ending the process illustrated in FIG. 7.

In this manner, the portable telephone terminal when it operates as a call terminating terminal can control the conversation recording function of the self terminal during communication appropriately taking regulations regarding the conversation recording function applied not only to the state or the region in which the self terminal is used but also to the region in which the call originating terminal is used into consideration.

When the Call Originating Terminal Is the Portable Telephone Terminal

The description given above relates to an example wherein the call originating terminal is a wired telephone and the call terminating terminal is the portable telephone terminal of the present embodiment. However, also another case is possible wherein the call originating terminal is a portable telephone terminal which has the configuration described above and can be connected to a communication system of the GSM system. Where the portable telephone terminal is a call originating terminal, it may possibly be used in various countries, and depending upon an international number provided to a call terminating terminal together with a subscriber telephone number of the call originating terminal, it is impossible to discriminate a state or a region in which the portable telephone terminal is used.

Therefore, where the call originating terminal is a portable telephone terminal, a state or a region in which the portable telephone terminal serving as the call originating terminal is used is discriminated using a country code added to information to be transmitted to the call terminating terminal by a base station which first repeats a radio wave from the portable telephone terminal serving as the call originating terminal.

It is to be noted that the following description is given of an example wherein the portable telephone terminal having the configuration described hereinabove with reference to FIG. 2 is used for both of the call originating terminal and the call terminating terminal. Further, in order to facilitate understanding of the operation, description is given separately of ① processing of the portable telephone terminal upon call origination, ② processing of a base station which repeats a communication request (originated call) from the call originating terminal, ③ processing of a repeating center, and ④ processing of the portable telephone terminal serving as the call terminating terminal.

① Processing of the Portable Telephone Terminal upon Call Origination

Figure 8:
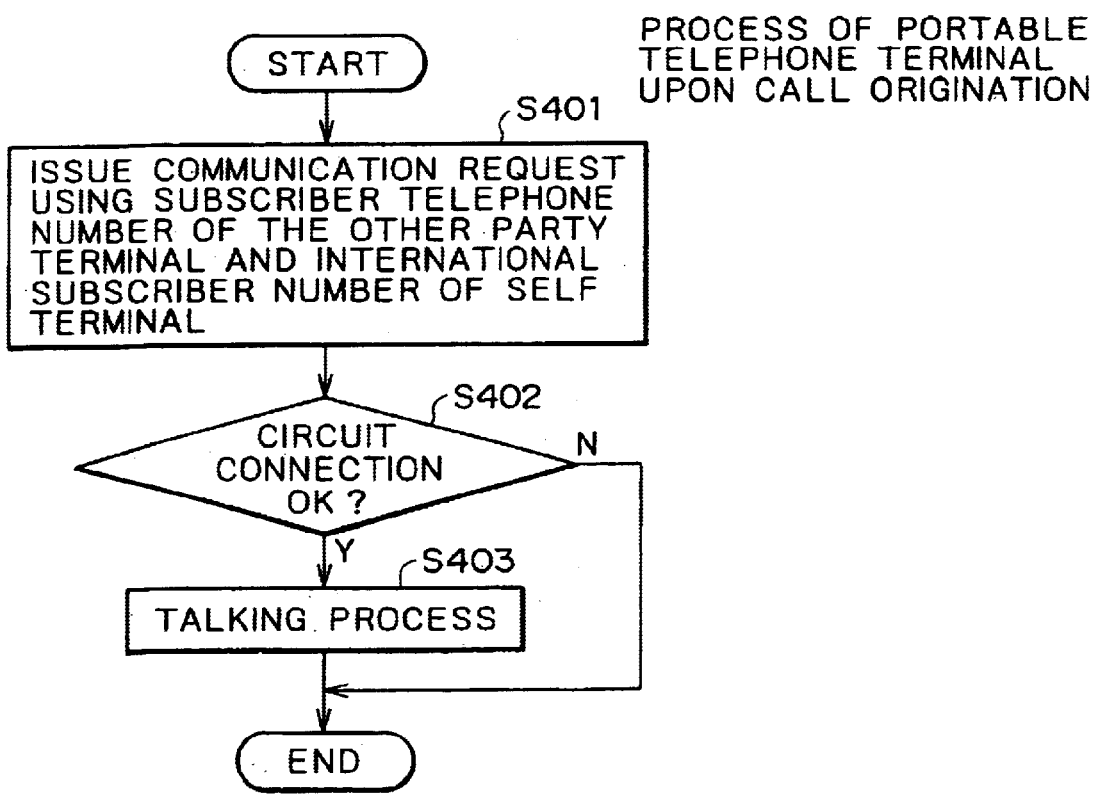
FIG. 8 is a flow chart illustrating a process when the portable telephone terminal originates a call.

FIG. 8 is a flow chart illustrating a process of the portable telephone terminal upon call origination. If an off-hook key provided on the keyboard section 234 provided on the portable telephone terminal is depressed, then the control section 220 of the portable telephone terminal accepts a subscriber telephone number of an object call terminating terminal inputted through the keyboard section 234 of the self terminal and transmits a communication request including the subscriber telephone number of the call terminating terminal, an international subscriber number of the self terminal and so forth (step S401).

The communication request is transmitted through the communication data coding section 219, transmission modulation section 215, transmission IF section 214, mixer 213, transmission RF section 212, common unit 202 and antenna 201 of the portable telephone terminal having the configuration described hereinabove with reference to FIG. 2. Then, the communication request from the portable telephone terminal is received and processed by the nearest base station as will be described hereinafter.

Then, the portable telephone terminal having transmitted the communication request discriminates based on information transmitted thereto from the base station whether or not a communication circuit is connected to the object call terminating terminal (step S402). Here, the information transmitted from the base station is received by the antenna 201 and supplied to the control section 220 of the portable telephone terminal through the reception demodulation section 206 and the communication data decoding section 210 as described hereinabove.

If it is discriminated in the discrimination processing in step S402 that a circuit is connected, then the control section 220 of the portable telephone terminal controls the pertaining components of the portable telephone terminal so that communication can be performed with the object call terminating terminal (step S403). On the other hand, if it is discriminated in the discrimination processing in step S402 that a circuit is not connected, then since communication cannot be performed, the process illustrated in FIG. 8 is ended.

Figure 9:
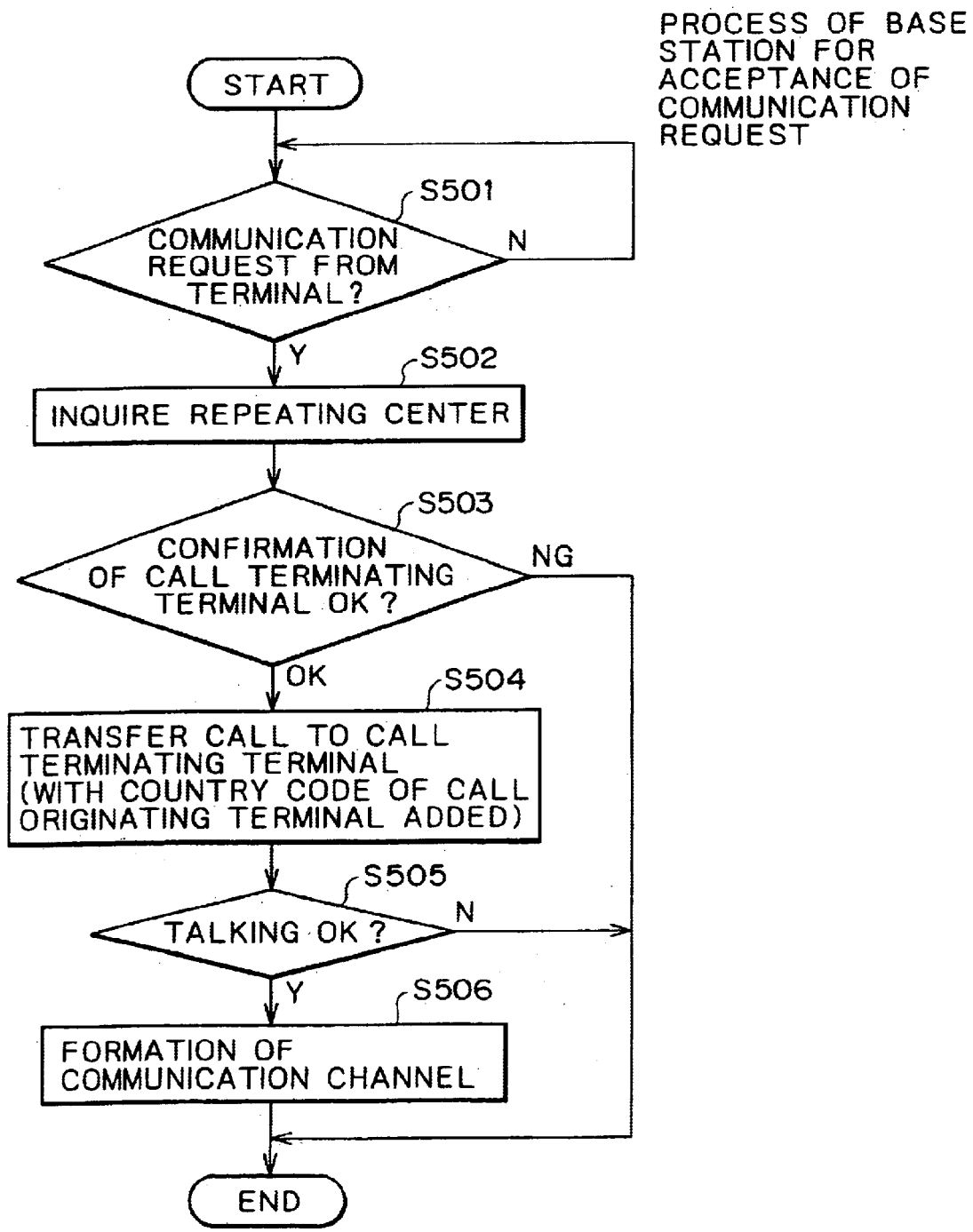
FIG. 9 is a flow chart illustrating a process performed in a base station which receives and repeats a communication request from the portable telephone terminal.

② Processing of the Base Station Which Repeats the Communication Request (Originated Call) from the Call Originating Terminal FIG. 9 is a flow chart illustrating a process of the base station which receives the communication request from the portable telephone terminal serving as the call originating terminal. Referring to FIG. 9, each base station waits for a communication request from a portable telephone terminal (step S501). If it is discriminated in the discrimination processing in step S501 that a communication request is received from a portable telephone terminal and it is discriminated from a subscriber telephone number allocated to the object call terminating terminal that the call terminating terminal is a portable telephone terminal, then the base station issues an inquiry for terminal position information of the object call terminating terminal to the repeating center 107 (step S502).

Then, the base station discriminates based on information transmitted back from the repeating center 107 whether or not the position of the object call terminating terminal has been confirmed successfully (step S503). If it is discriminated in the discriminating processing in step S503 that the position of the object call terminating terminal has been confirmed successfully, then the base station transfers the call to the object call terminating terminal (step S504).

In step S504, the base station of the area in which the call terminating terminal is positioned, that is, the base station in which the position of the call terminating terminal is registered, transmits a country code indicative of the region in which the base station is positioned together with the call from the call originating terminal to the object call terminating terminal. Then, the base station discriminates whether or not an off-hook operation has been performed on the object call terminating terminal to connect a telecommunication circuit to allow communication (step S505).

If it is discriminated in the discrimination processing in step S505 that a telecommunication circuit has been connected to allow communication, then the base station forms a channel (telecommunication circuit) to the object call terminating terminal to allow communication (step S506).

If it is discriminated in the discrimination processing in step S503 that the current position of the object call terminating terminal has not been confirmed successfully or if it is discriminated in the discrimination processing in step S505 that no response to the call transmitted to the object call terminating terminal is received, then since communication is impossible, the processing illustrated in FIG. 9 is ended.

In this manner, the base station of the area in which the call originating terminal is positioned specifies the position of the object call terminating terminal through inquiry to the repeating center 107 by the user of the call originating terminal. Then, the base station of the area in which the call originating terminal is positioned transmits a call to which a country code indicative of a region in which the base station is positioned is added to the object call terminating terminal. The object call terminating terminal can discriminate, based on the country code transmitted thereto together with the call from the call originating terminal, in a communication area of what state or what region the call originating terminal is positioned.

③ Processing of the Repeating Center

Figure 10:
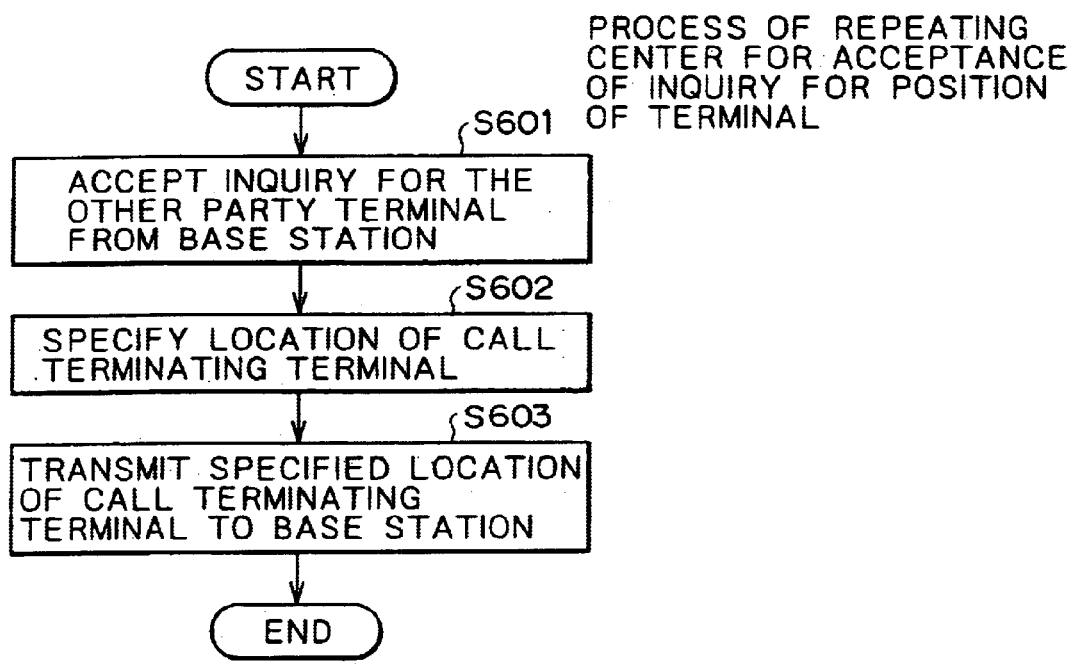
FIG. 10 is a flow chart illustrating a process performed in the repeating center which receives an inquiry for the position of a call terminating terminal from the base station.

FIG. 10 is a flow chart illustrating processing of the repeating center in the first embodiment. The repeating center accepts the inquiry for terminal position information of the object call terminating terminal from the base station (step S601) and specifies the terminal position of the object call terminating terminal from the information managed by the repeating center itself (step S602).

Then, the repeating center transmits terminal position information indicative of the terminal position of the object call terminating terminal specified in step S602 (step S603). In this instance, each portable telephone terminal has position registration in the repeating center 107 as described hereinabove with reference to the flow chart of FIGS. 3 and 4. Accordingly, the current position of any portable telephone terminal in an enabled state can be specified readily based on the information managed by the repeating center.

Then, since the country code indicative of the region in which the base station of the call originating terminal side is positioned is supplied from the base station to the object call terminating terminal as described hereinabove, the object call terminating terminal can specify with what base station in what region it is positioned for communication.

(4) Processing of the Portable Telephone Terminal Serving as the Call Terminating Terminal Thus, the portable telephone terminal serving as the call terminating terminal refers, based on the country code supplied together with the call from the call originating terminal and indicative of the region in which the base station which repeats a radio wave from the call originating terminal is positioned as described above, to the status table described hereinabove with reference to FIG. 5 to discriminate whether or not limitations to the conversation recording function during communication are applied in the region in which the call originating terminal is used. Then, if limitations to the conversation recording function during communication are applied, then the conversation recording function of the call terminating terminal is limited in accordance with the regulations.

Accordingly, where the call originating terminal is a portable telephone terminal, a country code of the call originating terminal side is extracted from information supplied upon call termination and a check of the country code is performed by the discrimination processing in step S302 of the flow chart shown in FIG. 7, and it is discriminated by the discriminating processing in step S303 whether or not a country code has been received, whereafter the status table shown in FIG. 5 is referred to using the country code by the processing in step S304.

Consequently, even if the call originating terminal is a portable telephone terminal, the call terminating terminal can be controlled in accordance with regulations such as laws applied to the state or the region in which the portable telephone terminal position is positioned so that the conversation recording function during communication may be limited.

When no International Number is Supplied from the Call Originating Terminal Side As described hereinabove, where a subscriber telephone number including an international number from a call originating terminal side is prevented from being reported in accordance with an instruction of a user of the call originating terminal or by operation of a network operator of a telephone company or the like, it cannot be discriminated whether or not regulations to the conversation recording function are applied in the state or the region in which the call originating terminal is used.

Therefore, as described hereinabove, in the first embodiment of the present invention, at least information such as voice provided from the call originating terminal can be inhibited from being recorded. This prevents violation of regulations to the conversion recording function which may be provided in a region in which the call originating terminal is used.

In such an instance, recording of information from the call originating terminal may not be inhibited, but alternatively warning sound for warning against use of the conversation recording function by the call terminating terminal side may be transmitted to the call originating terminal. In this instance, when the user of the call terminating terminal tries to use the conversation recording function, the user of the call originating terminal can discriminate this. Therefore, the user of the call originating terminal can take such a countermeasure as to ask the user of the call terminating terminal to stop recording of the conversation.

Limitation Control to a Particular Function of the Call Originating Terminal

The limitation control to the conversation recording function of the call terminating terminal in the first embodiment is described above. However, preferably the conversation recording function of the call originating terminal during communication can be limited appropriately. Therefore, in the first embodiment, where the portable telephone terminal is used as a call originating terminal, when the REC switch is switched on to render the conversation recording function during communication operative, warning sound is generated and transmitted to the call terminating terminal.

In particular, when the portable telephone terminal originates a call therefrom and the conversation recording function is in an enabled state, the control section 220 thereof controls the warning sound generation section 2161 of the voice coding section 216 to notify the call terminating terminal that the conversation recording function is used.

Consequently, even if the call originating terminal cannot specify a region in which the object call terminating terminal is used, when the conversation recording function during communication is used, it can transmit warning sound to the call terminating terminal. Accordingly, when the conversation recording function is used by the call originating terminal, this can be conveyed to the call terminating terminal with certainty. Consequently, such a countermeasure as to stop use of the conversation recording function can be taken in response to a request which may be received from the user of the call terminating terminal.

Further, as described hereinabove, whether or not the object party of telephoning is a portable phone terminal or a telephone terminal which is used in a fixed state such as a wired telephone terminal can be discriminated from a telephone number allocated to the object call terminating terminal. Therefore, where the object call terminating terminal is a telephone terminal used only in a predetermined state such as a wired telephone terminal, limitation to use of the conversation recording function by the call originating terminal may be performed based on an international number of the call terminating terminal including the inputted international number.

In particular, where the call terminating terminal is a wired telephone terminal, the above-described status table stored in the memory of the self terminal is referred to based on the international number added to the inputted telephone number to specify restrictions to the conversation recording function applied to a state in which the call terminating terminal is used so that the restrictions may be observed. Consequently, where the call terminating terminal is a wired telephone terminal, limitation control to use of the conversation recording function of the call originating terminal side can be performed taking also restrictions to the conversation recording function applied to the state in which the call terminating terminal is used into consideration.

It is to be noted that, also in this instance, such control as transmission of warning sound and inhibition of use of the conversation recording function as well as inhibition of recording or storage of information such as voice provided from the call terminating terminal can be performed.

Second Embodiment

In the first embodiment described above, an international number or a country code provided from a call originating terminal side to a call terminating terminal is used as a region identification code for limiting the conversation recording function which is a particular function of the call terminating terminal. However, in a communication system of the GSM system, when a portable telephone terminal is used, the position of it is registered into a repeating center as described hereinabove with reference to the flow charts of FIGS. 3 and 4.

In particular, the repeating center manages an international subscriber number, a subscriber telephone number and terminal position information of each portable telephone terminal in a standby state in a coordinated relationship. Thus, in the second embodiment, the repeating center uses also such information managed by the repeating center to form control information for limiting a particular function of a call terminating terminal and transmits the control information to the call terminating terminal.

It is to be noted that, also in the second embodiment, the communication system of the GSM system described hereinabove with reference to FIG. 1 is used and also the portable telephone terminal used has a configuration similar to that described hereinabove with reference to FIG. 2. Also in the second embodiment described below, a portable telephone terminal is used for both of the call originating terminal and the call terminating terminal, and the particular function to be limited is the conversation recording function during communication provided for the portable telephone terminals.

Also in the second embodiment, processing of a portable telephone terminal when it originates a call is similar to the processing of the portable telephone terminal of the first embodiment described hereinabove with reference to the flow chart of FIG. 8. The present embodiment, however, is different in the processing of the base station which receives a communication request from the call originating terminal, the processing of the repeating center which receives an inquiry for the position of the call terminating terminal from the base station of the call originating terminal side and the processing of the call terminating terminal from those of the first embodiment.

Figure 11:
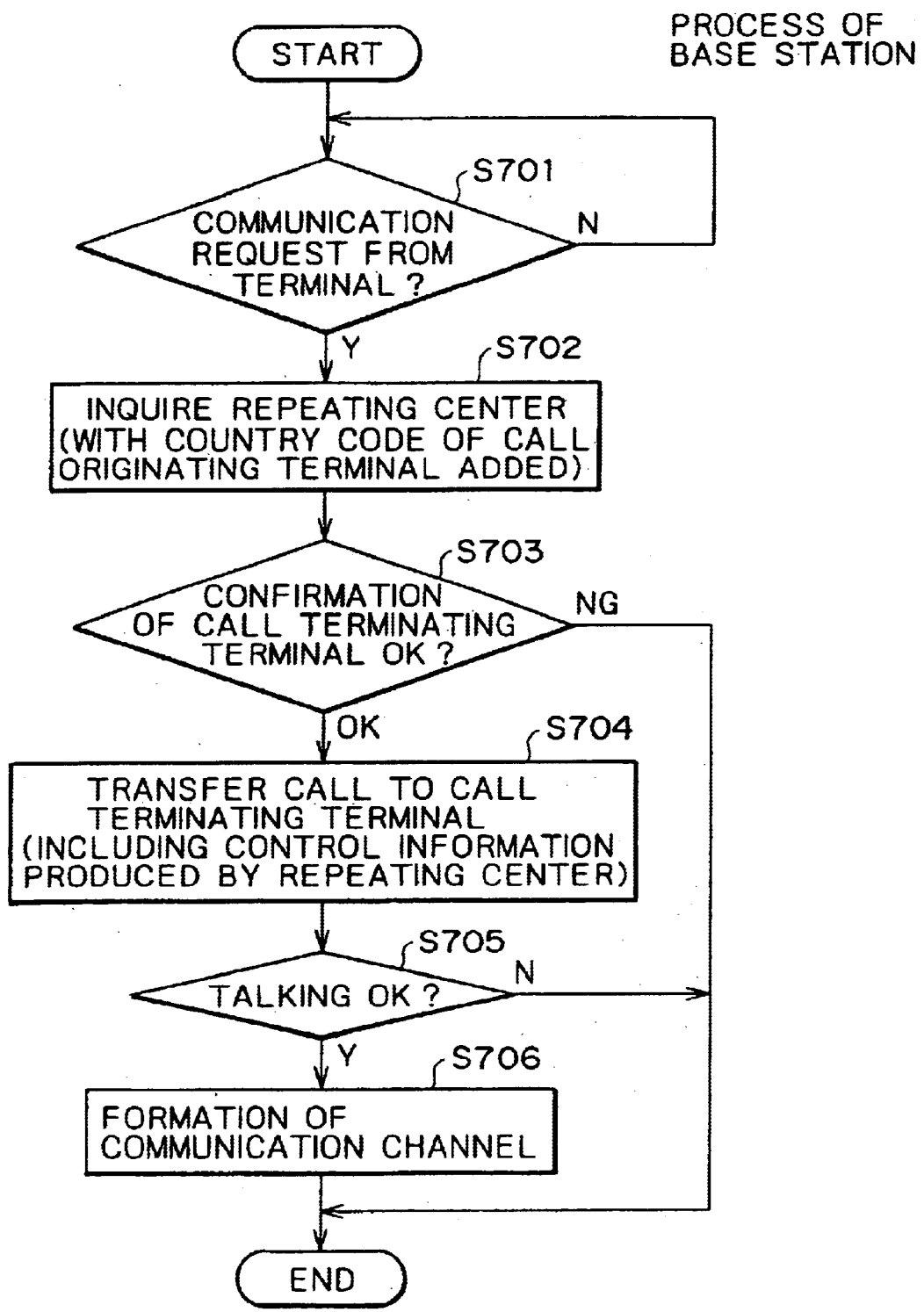
FIG. 11 is a flow chart illustrating another example of a process performed in the base station which receives and repeats a communication request from the portable telephone terminal.

Processing of the Base Station which Repeats a Communication Request (Originated Call) from the Call Originating Terminal FIG. 11 is a flow chart illustrating processing of a base station which receives a communication request from a portable telephone terminal serving as the call originating terminal. Referring to FIG. 11, each base station waits for a communication request from a portable telephone terminal (step S701). If it is discriminated in the discrimination processing in step S701 that a communication request is received from a portable telephone terminal and it is discriminated from a subscriber telephone number allocated to the object call terminating terminal that the call terminating terminal is a portable telephone terminal, then the base station transmits a country code of the base station indicative of a region in which the base station is positioned and issues an inquiry for terminal position information of the object call terminating terminal to the repeating center 107 (step S702).

The reason why the country code of the base station of the call originating terminal side is transmitted is that it is intended to notify the repeating center 107 of the position of the call originating terminal. This is because the country code of the base station which receives the communication request from the call originating terminal corresponds to a rough current position of the portable telephone terminal serving as the call originating terminal.

Then, the base station discriminates based on information transmitted back from the repeating center 107 whether or not the position of the object call terminating terminal has been confirmed successfully (step S703) If it is discriminated in the discrimination processing in step S703 that the position of the object call terminating terminal has been confirmed successfully, then the base station transfers the call from the call originating terminal together with control information provided by the repeating center 107 for limiting the conversation recording function of the call terminating terminal during communication as will be described hereinafter to the object call terminating terminal (step S704)

Then, the base station discriminates whether or not an off-hook operation has been performed on the object call terminating terminal to connect a circuit to allow communication (step S705) If it is discriminated in the discrimination processing in step S705 that a telecommunication circuit has been connected to allow communication, then the base station forms a channel (telecommunication circuit) from the portable telephone terminal to the object call terminating terminal to allow communication (step S706).

If it is discriminated in the discrimination processing in step S703 that the current position of the object call terminating terminal has not been confirmed successfully or if it is discriminated in the discrimination processing in step S705 that no response to the call transmitted to the object call terminating terminal is received, then since communication is impossible, the processing illustrated in FIG. 11 is ended.

In this manner, the base station of the call originating terminal side transmits, upon inquiry for terminal position information of the object call terminating terminal, a country code of the base station itself as current position information of the call originating terminal to the repeating center. Consequently, the repeating center can take the current position of the call originating terminal into consideration to produce control information to be used to control the call terminating terminal to limit the conversation recording function of the call terminating terminal.

Processing of the Repeating Center

Figure 12:
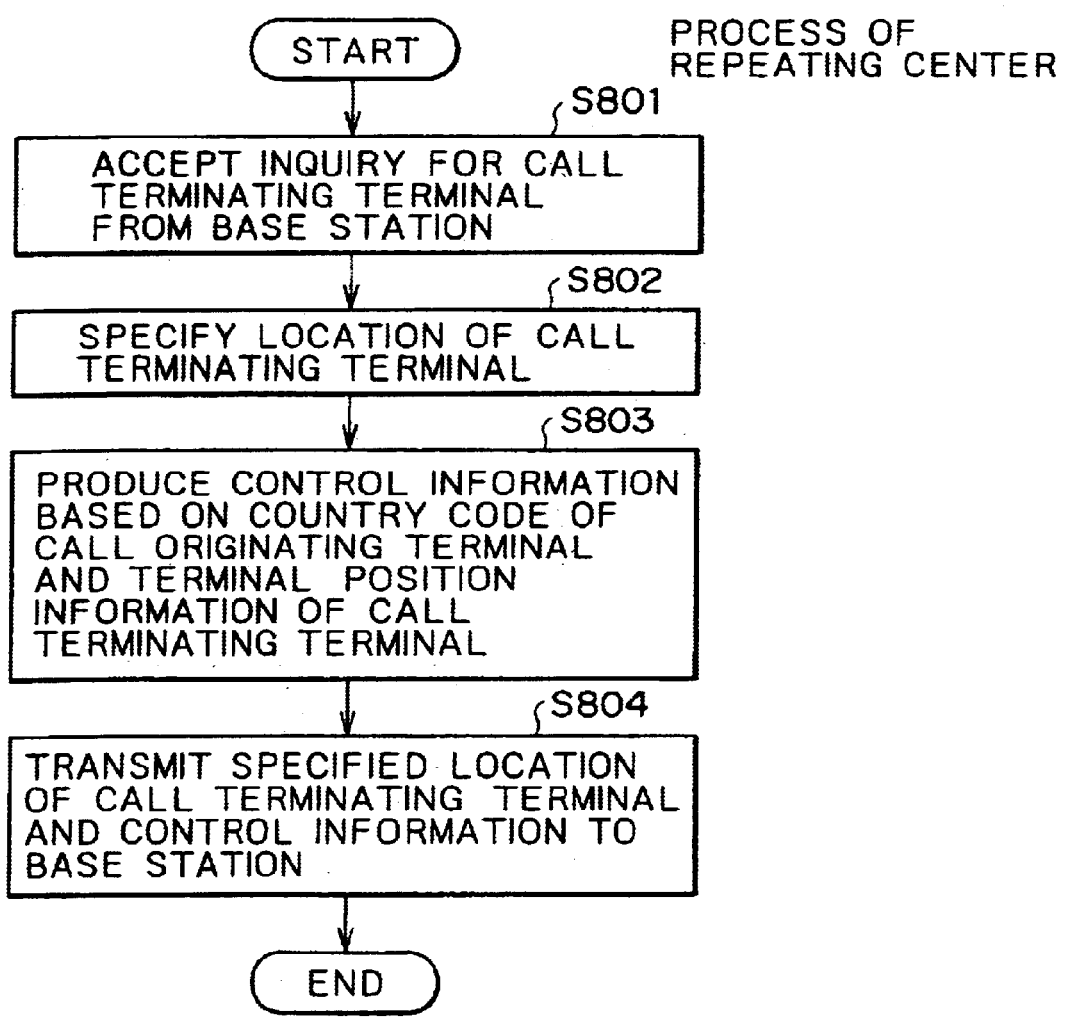
FIG. 12 is a flow chart illustrating another example of a process performed in the repeating center which receives an inquiry for the position of a call terminating terminal from the base station.

FIG. 12 is a flow chart illustrating a process of the repeating center 107 which receives an inquiry for the position of the call terminating terminal from the base station of the call originating terminal side. Referring to FIG. 12, the repeating center 107 accepts an inquiry for the terminal position of the object call terminating terminal including a country code of the base station of the call originating terminal side (step S801) Then, the repeating center 107 specifies the terminal position of the object call terminating terminal from the information managed by the repeating center itself (step S802).

Then, the repeating center 107 produces control information to be used to control the call terminating terminal to limit the conversation recording function of the call terminating terminal based on the country code from the base station of the call originating terminal side and the specified terminal position information of the call terminating position (step S803).

In particular, in the second embodiment, the repeating center 107 includes such a status table as illustrated in FIG. 5 and produces control information for limiting the conversation recording function of the call terminating terminal during communication based on the position information (country code) of the call originating terminal and the terminal position information of the call terminating position.

Then, the repeating center 107 transmits the terminal position of the object call terminating terminal specified in step S802 and the produced control information back to the base station from which the inquiry has been transmitted (step S804). Then, as described above, if the position of the call terminating terminal is specified, then since the call from the call originating terminal is transmitted together with the control information back to the call terminating terminal, the call terminating terminal can control itself in accordance with the control information produced by the repeating center when the call terminating terminal uses the conversation recording function.

It is to be noted that, in the second embodiment, the repeating center produces, in step S803, control information for inhibiting use of the conversation recording function of the call terminating terminal typically if recording of conversation upon communication is inhibited in at least one of a country or a region in which the call originating terminal is used or another country or another region in which the call terminating terminal is used.

Further, where it is prescribed at least in a region in which the call terminating terminal is used that, when it is tried to record conversation during communication, this must be conveyed to the other party side, when the conversation recording function of the call terminating terminal is used, the repeating center 107 produces control information for controlling so that warning sound is transmitted to the call originating terminal side.

In short, similarly as in the first embodiment, also in the second embodiment, control information for limiting the conversation recording function of the call terminating terminal taking both of regulations such as laws applied in a state or a region in which the call originating terminal is used and regulations such as laws applied to a country or a region in which the call terminating terminal is used into consideration, and the thus produced control information is transmitted to the call terminating terminal.

It is to be noted that the control information is not limited to the specific control information described above, but can be produced in accordance with a combination of both of regulations such as laws applied in a state or a region in which the call originating terminal is used and regulations such as laws applied to a state or a region in which the call terminating terminal is used.

Processing of the Portable Telephone Terminal Serving as the Call Terminating Terminal FIG. 13 is a flow chart illustrating a process of the call terminating terminal in the second embodiment and particularly illustrating a process of the call terminating terminal which controls to limit the conversation recording function in accordance with control information produced by the repeating center 107.

Also in the call terminating terminal in the form of a portable telephone terminal of the second embodiment, as seen in FIG. 13, the control section 220 first discriminates whether or not the REC switch (recording switch) is on, that is, whether or not the conversation recording function is in an enabled state (step S901).

If it is discriminated in the discrimination processing in step S901 that the REC switch is not on, then the process illustrated in FIG. 13 is ended because the conversation recording function is not ready for use. If it is discriminated in the discrimination process in step S901 that the REC switch is on, then the control section 220 of the call terminating terminal performs processing for detecting control information produced by the repeating center from information of the received call (step S902).

Then, the control section 220 discriminates whether or not control information has been detected successfully (step S903). If it is discriminated in the discrimination processing in step S903 that control information has not been detected successfully, then the control section 220 determines that no applicable restrictions to recording of conversation during communication is present, and the CPU 224 of the call terminating terminal controls the pertaining components to perform recording of conversation during communication (step S906).

If it is discriminated in the discrimination processing in step S903 that control information has been detected successfully, then the control section 220 of the call terminating terminal discriminates whether or not the control information designates transmission of warning sound (step S904). If it is discriminated in the discrimination processing in step S904 that the control information designates transmission of warning sound, then the control section 220 of the call terminating terminal controls the warning sound generating section 2161 of the voice coding section 216 to generate warning sound and transmits the warning sound to the call originating terminal (step S905). Then, the control section 220 of the call terminating terminal controls the pertaining components to perform recording of conversation (step S906).

On the other hand, if it is discriminated in the discrimination processing in step S904 that the control information is not a transmission instruction of warning sound, then since it can be determined that the control information indicates inhibition of recording of conversation during communication, the processing advances to step S907, in which the CPU 224 of the call terminating terminal controls the pertaining components so that the conversation recording function may not operate.

Since the repeating center 107 forms control information for controlling the call terminating terminal to limit the conversation recording function of it during communication and transmits the control information to the call terminating terminal, information such as the status table illustrated in FIG. 5 need not be provided in the portable telephone terminal serving as the call terminating terminal.

Where the Call Originating Terminal is a Wired Telephone Terminal or the Like Other Than a Portable Telephone Terminal Where the call originating terminal is not a portable telephone terminal but a telephone terminal used in a fixed state such as a wired telephone terminal, typically the PSTN station 106 transmits an international number to be provided to the call terminating terminal together with a subscriber telephone number of the call originating terminal to the repeating center 107.

The repeating center 107 uses the international number as a region identification code representative of a state or a region in which the call originating terminal is positioned to produce control information. Naturally, in this instance, the repeating center 107 produces control information taking also position information of the call terminating terminal into consideration.

As a result, even if the call originating terminal is a wired telephone terminal, the call terminating terminal can be controlled to limit the conversation recording function thereof during communication in accordance with control information produced taking a state or a region in which the wired telephone terminal is used into consideration.

It is to be noted that, in the foregoing description of the second embodiment, the repeating center 107 forms control information taking not only a country code or an international number from the call originating terminal side but also terminal position information of the call terminating terminal which is information possessed by the repeating center 107 into consideration. However, the method of formation of control information is not limited to this.

In particular, control information may naturally be formed based only on a country code or an international number from the call originating terminal side. In this instance, limitation control to the conversation recording function of the call terminating terminal based on a country or a region in which the call originating terminal is used is performed based on control information produced by the repeating center 107.

Further, as described above, limitation control to the conversation recording function of the call terminating terminal during communication based on a country or a region in which the call terminating terminal is used may be performed based on a country code provided by the BCCH from the base station of the area in which the call terminating terminal is used.

Control of the Conversation Recording function of the Call Originating Terminal

It is to be noted that, in the second embodiment, the repeating center can discriminate the terminal position of the object call terminating terminal. Therefore, similarly to the control information produced for the call terminating terminal, control information for limiting the conversation recording function of the call originating terminal side is produced based on the country code of the base station of the call originating terminal side and the terminal position information of the call terminating terminal and is transmitted back to the call originating terminal through the base station of the call originating terminal side.

Consequently, also the call originating terminal can be controlled to limit the conversation recording function of the self terminal in accordance with regulations applied to a region in which the object call terminating terminal (portable telephone terminal) is used. In other words, it is possible to transmit warning sound for warning that recording of the conversation is performed or disable (inhibit use of) the conversation recording function of the call originating terminal taking regulations such as laws applied to a state or a region in which the call terminating terminal is used into consideration.

Further, where, in the second embodiment, the call originating terminal is a portable telephone terminal and the call terminating terminal is a wired telephone terminal, if a country code of the base station of the call originating terminal side is transmitted to the wired telephone terminal as the call terminating terminal as in the first embodiment described hereinabove, then limitation control to the conversation recording function during communication can be performed taking also regulations such as laws applied to a state or a region in which the call originating terminal is used into consideration.

Further, where the call originating terminal is a wired telephone terminal, if control information for the call originating terminal produced by the repeating center 107 is transmitted from the repeating center 107 back to the call originating terminal as described hereinabove, then even if the call originating terminal is a wired telephone terminal, the call originating terminal can be controlled to limit the conversation recording function of itself in accordance with the control information.

Furthermore, similarly as in the first embodiment described hereinabove, where the call terminating terminal is a wired telephone terminal, the call originating terminal can be controlled to limit the conversation recording function of itself during communication based on an international number applied to a subscriber telephone number of the call terminating terminal inputted by the user of the call originating terminal.

Third Embodiment

Also it is possible for the call originating terminal to accept an instruction input of whether use of the conversation recording function is to be enabled or disabled from a user of the call originating terminal, form control information in response to the accepted instruction input and transmit the control information to the call terminating terminal. In this instance, it is not necessary to specify contents of regulations applied to a region in which the call originating terminal is used from a country code or an international number as described above, and the call terminating terminal can control itself to limit the conversation recording function thereof based on the control information supplied from the call originating terminal.

In other words, not a country code or an international number is transmitted from the call originating terminal side to the call terminating terminal as in the first embodiment or not control information formed by the repeating center 107 is transmitted to the call terminating terminal as in the second embodiment, but control information based on the will of the user of the call originating terminal is transmitted from the call originating terminal to the call terminating terminal.

It is to be noted that, also in the third embodiment, a communication system of the GSM system described hereinabove with reference to FIG. 1 is used, and also a portable telephone terminal used has a configuration similar to that described hereinabove with reference to FIG. 2. Also in the third embodiment described below, a portable telephone terminal is used for both of the call originating terminal and the call terminating terminal, and the particular function to be limited is the conversation recording function during communication provided for the portable telephone terminals.

FIG. 14 is a flow chart illustrating a process of a portable telephone terminal upon call origination in the third embodiment. Referring to FIG. 14, the control section 220 of the portable telephone terminal in the third embodiment accepts, upon call origination, a subscriber telephone number of the other party inputted through the keyboard section 234 and transmits a communication request including also an international subscriber number of the self terminal (step S1001) similarly to the portable telephone terminals in the first and second embodiments described hereinabove.

Further, the CPU 224 of the portable telephone terminal in the third embodiment accepts an input of control information for controlling the object call terminating terminal to limit the conversation recording function of it during communication (step S1002). Here, the information accepted from the user is information for issuing an instruction to emit warning sound when the call terminating terminal tries to use the conversation recording function, information for issuing an instruction to disable the conversation recording function when the call terminating terminal tries to use the conversation recording function or the like.

Then, the CPU 224 of the portable telephone terminal discriminates whether or not control information is inputted (S1003). If it is discriminated that control information is inputted, then the CPU 224 transmits the inputted control information to the object call terminating terminal (step S1004). When it is discriminated in the discrimination processing in step S1003 that control information is not inputted or when the control information is signaled to the call terminating terminal by the processing in step S1004, the CPU 224 discriminates whether or not a communication circuit is connected to the object call terminating terminal (step S1005).

If it is discriminated in the discrimination processing in step S1005 that a telecommunication circuit is connected, then the CPU 224 of the portable telephone terminal controls the pertaining components of the portable telephone terminal to perform communication processing (step S1006). On the other hand, if it is discriminated in the discrimination processing in step S1005 that a telecommunication circuit is not connected, then since communication cannot be performed, the process illustrated in FIG. 14 is ended.

In this manner, upon call origination, the portable telephone terminal can accept an input of control information from the user and transmit the inputted control information to the call terminating terminal. It is to be noted that the control information is determined in advance such that, for example, "00" represents an instruction to transmit warning sound, and "01" represents an instruction to inhibit use of the conversation recording function. Thus, upon inputting of control information, it can be inputted by a simple keyboard operation in accordance with a guidance displayed on a display unit of the portable telephone terminal.

Also it is naturally possible to accept an input of instruction information for producing control information, produce control information in accordance with the instruction input on the call originating terminal and transmit the control information.

FIG. 15 is a flow chart illustrating a process of the base station which receives a communication request from a portable telephone terminal which accepts, upon call origination, an input of control information for controlling the conversation recording function of the call terminating terminal and transmits the control information. Referring to FIG. 15, the processing in steps S1101 to S1103 of the flow chart shown is similar to the processing in respectively corresponding steps S501 to S503 of the base station of the call originating terminal side in the first embodiment described hereinabove with reference to FIG. 9.

Then, if the base station of the call originating terminal side of the third embodiment discriminates in the discriminating processing in step S1103 based on a response from the repeating center that the position of the call terminating terminal has been confirmed successfully, then it transfers the control information inputted to the call originating terminal by the user together with the call from the call originating terminal to the call terminating terminal (step S1104).

The processing in the succeeding steps S1105 and S1106 is similar to the processing in respectively corresponding steps S505 and S506 of the process of the base station of the call originating terminal side of the first embodiment illustrated in FIG. 9.

Where control information from a portable telephone terminal serving as the call originating terminal is transmitted to the call terminating terminal through a base station in this manner, the call terminating terminal can receive the control information from the call originating terminal and control itself to limit the conversation recording function in accordance with the control information. Accordingly, in the third embodiment, the processing of the call terminating terminal is similar to the processing of the call terminating terminal in the second embodiment described hereinabove with reference to FIG. 13.

While, in the foregoing description of the third embodiment, both of the call originating terminal and the call terminating terminal are portable telephone terminals, they need not be such special terminals. Both of the call originating terminal and the call terminating terminal may be telephone terminals which are used only in predetermined states such as wired telephone terminals, or one of the call originating terminal and the call terminating terminal may be a portable telephone terminal.

Further, in the third embodiment, it is described that control information to be provided to the call terminating terminal is transmitted from the call originating terminal. However, control information need not necessarily be transmitted from the specific terminal. For example, where the other party terminal is a portable telephone terminal which can be connected to a communication system of the GSM system, it is otherwise possible for the call originating terminal to transmit an instruction to the repeating center 107 to produce and transmit control information conforming with a will of the user of the call originating terminal so that the repeating center 107 produces control information to be transmitted to the call terminating terminal and transmits the control information to the call terminating terminal.

It is to be noted that each portable telephone terminal in the embodiments described above includes the voice recording memory 2071 provided in the voice decoding section 207 as described hereinabove with reference to FIG. 2. However, in a popular configuration of a portable terminal, the voice decoding section 207 and the voice coding section 216 are incorporated in or formed as a DSP (Digital Signal Processor). Since a DSP includes a RAM, an area for use to record conversation during communication may be allocated to the RAM of the DSP. In other words, not only a portable telephone terminal having the configuration described hereinabove with reference to FIG. 2 but also various other telephone communication terminals having different configurations can be used.

Further, in the embodiments described above, the conversation recording function during communication is an information signal processing function of a telephone terminal. However, the information signal processing function is not limited to the conversation recording function during communication. Recently, also a portable telephone terminal which can transmit image information is available. Therefore, it is possible to use such limitation control as to inhibit recording and storage of image information transmitted from the other party side.

Also it has become possible to communicate various digital data such as text data, computer data, a game program or music data through a portable telephone terminal. Thus, the present invention can be applied also to such limitation control as inhibition of the recording storage function in a reception terminal of the type just mentioned.

In other words, from the problem of privacy or the problem of the right of portrait or the copyright, it is possible to control a particular function of a communication terminal such as a telephone communication terminal taking regulations such as laws applied not only in a region in which the person in question is positioned but also in a state or a region in which the other party of communication is positioned into consideration in regard to items limited upon telephone communication by a state or a region.

Further, in recent years, a portable information communication unit for personal use which can be connected to a telephone communication network called PDA (Personal Digital Assistants) is utilized widely. The present invention can be applied also to such an information communication unit which can be connected to a telephone communication network as just described as a telephone communication terminal which can be connected to a telephone communication network to limit a particular function of the communication terminal.

Further, in the embodiments described above, a communication system of the GSM system is used. However, the communication system is not limited to that of the GSM system, and the present invention can be applied also to a communication system to which any other communication method is applied.

It is to be noted that, in the embodiments described above, a base station and a repeating center are provided separately from each other. However, a base station or a repeating center which has functions of both of a base station and a repeating center may be provided in a communication system.

Further, in the second embodiment described above, it is described that, where a portable telephone terminal which can be connected to a communication system of the GSM system is used, a repeating center may produce control information. The specific construction, however, need not be used. Also where a management center for managing wired telephone terminals (subscriber terminals) is provided for a PSTN (Public Switched Telephone Network), the management center can produce control information for limiting the function of a telephone terminal similarly to the repeating center described hereinabove.

Furthermore, all of the methods described above individually with regard to the first, second and third embodiments may be used so that a suitable one of them may be used selectively in conformity with an individual case.

For example, where one of communication terminals is a portable telephone terminal and the other communication terminal is a wired telephone terminal, the method of the first or second embodiment may be applied, but where both telephone terminals are portable telephone terminals, the method of the second embodiment may be used.

Naturally it is possible to use both of the methods of the first and third embodiments or use both of the methods of the second and third embodiments.

Meanwhile, the warning sound may be buzzer sound, alarm sound or a melody (music) or else may be various voice information such as a voice message of "Conversation is recorded". In this instance, the language for use with the voice message may be any language such as, for example, Japanese or English. Where a telephone terminal has a function of displaying message information, display message information may be transmitted. Further, control information for causing a warning indication element such as a light emitting diode (LED) to emit light or blink may be transmitted.

In other words, in order to transmit a notification of use of an information signal processing function, various methods can be used such as transmission of a voice message, transmission of a display message and transmission of information for controlling an indication element.

Further, in the embodiments described above, for example, the call terminating terminal takes a state or a region in which the call originating terminal is used and/or a state or a region in which the call terminating terminal is used into consideration. In this instance, where recording of conversation during communication is limited in the region in which the call originating terminal is positioned, it is possible to inhibit the call terminating terminal from recording only voice information from the call originating terminal but allow the call terminating terminal to record voice information inputted to the call terminating terminal by a user of the call terminating terminal.

In this manner, where a region in which the person in question is positioned and a region in which the other party of communication is positioned are taken into consideration, it is possible to inhibit recording of voice information from one of talkers of communication in accordance with a combination of them. In such an instance, in the embodiments described above, one of voices to be record otherwise into the voice recording memory 2071 of the voice decoding section 207 is controlled so as not to be supplied as information to be recorded to the voice recording memory 2071.

Further, in such a case that it is known that the self terminal is always used in a region in which no limitation to the conversation recording function is applied, only the region in which the call originating terminal is positioned should be taken into consideration. In this instance, it is possible to take only the region in which the other party of communication is positioned into consideration but eliminate the region in which the person in question is positioned out of consideration. This can be realized by modifying the program to be executed by the control section 220.

Further, where not a region in which a portable telephone terminal is actually used but a region such as a state in which subscriber registration is present matters, not a country code of a base station but an international number transmitted together with a subscriber telephone number may always be used.

While preferred embodiments of the present invention have been described using specific terms, such description is for illustrative purposes only, and it is to be understood that changes and variations may be made without departing from the spirit or scope of the following claims.

What is claimed is:

1. A function limiting method for limiting an information signal recording function of a telephone communication terminal, comprising the steps of:

detecting a region identification code used for identifying a state or a region in which a call originating terminal is located, the region identification code being included in information received upon origination of a call from the call originating terminal; and performing limitation control on the information signal recording function based on the region identification code detected in the step of detecting.

2. The function limiting method for a telephone communication terminal according to claim 1, wherein, in the step of detecting, a state code transmitted together with a telephone number allocated to the call originating terminal is detected as the region identification code.

3. The function limiting method for a telephone communication terminal according to claim 2, wherein, when it is designated by a user of the call originating terminal that the telephone number allocated to the call originating terminal should not be conveyed or when the region identification code is not detected successfully by the step of detecting, limitation to the information signal recording function is executed in the step of performing limitation control.

4. The function limiting method for a telephone communication terminal according to claim 1, wherein the call originating terminal is a portable telephone communication terminal, and the region identification code is added by a base station.

5. The function limiting method for a telephone communication terminal according to claim 1, wherein the information signal recording function includes recording a conversation during communication, and recording a conversation during communication is inhibited in the step of performing limitation control.

6. The function limiting method for a telephone communication terminal according to claim 1, wherein the information signal recording function includes recording a conversation during communication, and in the step of performing limitation control, when recording a conversation is performed, an other party is notified that the conversation is being recorded.

7. The function limiting method for a telephone communication terminal according to claim 1, wherein the information signal recording function includes recording an information signal transmitted from an other party, and in the step of performing limitation control, recording of the information signal transmitted from the other party is inhibited.

8. A function limiting method for limiting an information signal recording function of a telephone communication terminal, comprising the steps of:
  detecting control information used to limit the information signal control information that is included in information received upon origination of a call from a call originating terminal, wherein the control information is a region ID code used for identifying a state or region in which the call originating terminal is located; and
  performing limitation control on the information signal recording function based on the control information detected in the step of detecting.

9. The function limiting method for a telephone communication terminal according to claim 8, wherein the information signal recording function includes recording a conversation during communication, and the recording of conversation during communication is inhibited in the step of performing limitation control.

10. The function limiting method for a telephone communication terminal according to claim 8, wherein the information signal recording function includes recording a conversation during communication, and in the step of performing limitation control, when the recording of the conversation is performed during communication, an other party is notified that the conversation is being recorded.

11. The function limiting method for a telephone communication terminal according to claim 8, wherein the information signal recording function includes recording an information signal transmitted from the an other party, and in the step of performing limitation control, recording of the information signal transmitted from the other party of the communication is inhibited.

12. A telephone communication method, comprising the steps of:
  transmitting control information used to control a call terminating terminal to limit an information signal recording function of the call terminating terminal from a call originating terminal, wherein the control information is a region ID code used for identifying a state or region in which the call originating terminal is located; and
  receiving the control information at the call terminating terminal and controlling the information signal recording function of the call terminating terminal based on the received control information.

13. The telephone communication method according to claim 12, wherein the control information from the call originating terminal side is produced in response to instruction input information from a user of the call originating terminal and is transmitted to the call terminating terminal.

14. The telephone communication method according to claim 12, wherein the information signal recording function includes recording a conversation during communication, and the control information indicates an inhibition of the recording of a conversation during communication.

15. The telephone communication method according to claim 12, wherein the information signal recording function includes recording a conversation during communication, and the control information is an instruction to notify an other party that the conversation is being recorded when the recording of a conversation during communication is performed.

16. The telephone communication method according to claim 12, wherein the information signal recording function includes recording an information signal transmitted from an other party of the communication, and the control information is an instruction to inhibit recording of the information signal transmitted from the other party of the communication.

17. A telephone communication method for a plurality of telephone communication terminals wherein at least one of the telephone communication terminals is a portable telephone communication terminal, the method comprising the steps of:
  producing, by a repeating center that manages position information of the portable telephone communication terminal, control information used to control a call terminating terminal to limit an information signal recording function of the call terminating terminal based on information included in call origination information transmitted from a call originating terminal side, and transmitting the control information to the call terminating terminal, wherein the control information is a region ID code used for identifying a state or region in which the call originating terminal is located; and
  receiving, by the call terminating terminal, the control information and controlling the call terminating terminal to limit the information signal recording function based on the received control information.

18. The telephone communication method according to claim 17, wherein the repeating center produces the control information based on a state code transmitted together with a telephone number allocated to the call originating terminal from the call originating terminal.

19. The telephone communication method according to claim 17, wherein the call originating terminal is a portable telephone communication terminal, and the repeating center produces the control information based on a country code added by a base station in an area where the call originating terminal is located.

20. The telephone communication method according to claim 17, wherein the repeating center produces the control information based on instruction information that a user of the call originating terminal inputted into the call originating terminal.

21. The telephone communication method according to claim 17, wherein the information signal recording function includes recording a conversation during communication, and the control information indicates inhibition of the recording of the conversation during communication.

22. The telephone communication method according to claim 17, wherein the information signal recording function includes recording a conversation during communication, and the control information is an instruction to notify when recording of conversation during communication is performed.

23. The telephone communication method according to claim 17, wherein the information signal recording function includes recording an information signal transmitted from an other party, and the control information is an instruction to inhibit recording of the information signal transmitted from the other party of the communication.

24. A telephone communication terminal, comprising:
  information signal recording means for recording received information signal;
  detection means for detecting a region identification code used for identification of a state or a region in which a call originating terminal is used, the region identification code being included in information received upon origination of a call from the call originating terminal; and control means for performing limitation control of information signal recording performed by the information signal recording means based on the region identification code detected by the detection means.

25. The telephone communication terminal according to claim 24, wherein the detection means further detects a state code transmitted together with a telephone number allocated to the call originating terminal as the region identification code.

26. The telephone communication terminal according to claim 25, wherein, when it is designated by a user of the call originating terminal that the telephone number allocated to the call originating terminal should not be conveyed or when the state code transmitted together with a telephone number is not detected by said detection means, the control means executes limitation control over the information signal recording means.

27. The telephone communication terminal according to claim 24, wherein the detection means detects a country code added by a base station in an area where the call originating terminal is located as the region identification code.

28. The telephone communication terminal according to claim 24, wherein the information signal recording means records a conversation during communication, and said control means controls the information signal recording means to inhibit the recording of the conversation during communication.

29. The telephone communication terminal according to claim 24, wherein the information signal recording means records a conversation during communication, and when the recording of a conversation is performed during communication.

30. The telephone communication terminal according to claim 24, wherein the information signal recording means records an information signal transmitted from the another party, and the control means controls the information signal recording means to disable recording of information signal transmitted from the other party.

31. A telephone communication terminal, comprising:
information signal recording means for recording received information signal;
detection means for detecting control information included in information received upon origination of a call and used for information signal recording executed by the information signal recording means, wherein the control information is a region ID code used for identifying a state or region in which the call originating terminal is located; and
control means for performing limitation control of information signal recording performed by the information signal recording means based on the control information detected by the detection means.

32. The telephone communication terminal according to claim 31, wherein the information signal recording means records a conversation, and the control means controls the information signal recording means to inhibit the recording of the conversation.

33. The telephone communication terminal according to claim 31, wherein the information signal recording means records a conversation, and when the recording of the conversation is performed.

34. The telephone communication terminal according to claim 31, wherein the information signal recording means records an information signal transmitted from an other party, and the control means controls the information signal recording means to disable recording of the information signal transmitted from the other party of the communication.

35. A telephone communication terminal, comprising:
instruction input acceptance means for accepting an instruction input regarding control information for limiting an information signal recording function of a call terminating terminal;
control information production means for producing control information used to control the call terminating terminal to limit the information signal recording function of the call terminating terminal in response to the instruction input accepted by the instruction input acceptance means, wherein the control information is a region ID code used for identifying a state or region in which the telephone communication terminal is located; and
control information transmission means for transmitting the control information produced by the control information production means to the call terminating terminal.

36. A telephone communication terminal, comprising:
instruction input acceptance means for accepting instruction input information regarding control information for limiting an information signal recording function of a call terminating terminal, wherein the control information is a region ID code used for identifying a state or region in which the telephone communication terminal is located; and
transmission means for transmitting the instruction input information accepted by the instruction input acceptance means.

37. A repeating center equipment connected to a communication network for managing location information of a portable telephone communication terminal connected to the communication network, comprising:
control information production means for producing control information used to control a call terminating portable telephone to limit an information signal recording function of the call terminating portable telephone based on information included in call origination information from a call originating terminal, wherein the control information is a region ID code used for identifying a state or region in which the call originating terminal is located; and
control information transmission means for transmitting the control information to the call terminating terminal.

38. The repeating center equipment according to claim 37, wherein the control information production means produces the control information based on a state code transmitted together with a telephone number allocated to the call originating terminal.

39. The repeating center equipment according to claim 37, wherein the call originating terminal is a portable telephone communication terminal, and the control information production means produces the control information based on a country code added by a base station in an area where the call originating terminal is located.

40. The repeating center equipment according to claim 37, wherein the call originating terminal accepts an instruction input regarding control information for limiting a predetermined function of a terminal of an other party and transmits the call origination information in which information based on the instruction input is included, and the control information production means produces the control information based on instruction input information from a user of the call originating terminal included in the call origination information from the call originating terminal.

* * * * *